US012531946B2

(12) United States Patent
 Deng

(10) Patent No.: US 12,531,946 B2
(45) Date of Patent: *Jan. 20, 2026

(54) METHOD FOR PLAYING MULTIMEDIA CUSTOMIZED RINGING SIGNAL AND CUSTOMIZED ALERTING TONE, AND APPLICATION SERVER

(71) Applicant: HUAWEI TECHNOLOGIES CO., LTD., Guangdong (CN)

(72) Inventor: Zhilei Deng, Nanjing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,356

(22) Filed: Nov. 13, 2023

(65) Prior Publication Data

US 2024/0089369 A1 Mar. 14, 2024

Related U.S. Application Data

(63) Continuation of application No. 17/487,864, filed on Sep. 28, 2021, now Pat. No. 11,849,067, which is a
(Continued)

(30) Foreign Application Priority Data

Mar. 28, 2019 (CN) .......................... 201910245356.4
Sep. 20, 2019 (CN) .......................... 201910892751.1

(51) Int. Cl.
 *H04M 3/42* (2006.01)
(52) U.S. Cl.
 CPC ............................... *H04M 3/42017* (2013.01)
(58) Field of Classification Search
 CPC .............. H04M 3/42017; H04M 3/02; H04M 3/42051; H04L 65/1063; H04L 65/1069;
(Continued)

(56) References Cited

U.S. PATENT DOCUMENTS 8,670,751 B2 * 3/2014 Ge ....................... H04L 65/1096
  455/412.2
8,908,845 B2 * 12/2014 Li ..................... H04M 3/42017
  379/201.01
(Continued)

FOREIGN PATENT DOCUMENTS

CA 2750670 8/2010
CN 101076198 11/2007
(Continued)

OTHER PUBLICATIONS

3GPP TS 22.183 V15.0.0, "3rd Generation Partnership Project; Technical Specification Group Services and System Aspects; Customized Ringing Signal (CRS) Requirements; Stage 1 (Release 15)," Jun. 2018, 14 pages.
(Continued)

*Primary Examiner* — Akelaw Teshale
(74) *Attorney, Agent, or Firm* — Fish & Richardson P.C.

(57) ABSTRACT

An example method for playing a multimedia customized ringing signal and customized alerting tone includes receiving, by an application server, an initial call request from a calling terminal, sending the initial call request to a called terminal, receiving a provisional response to the initial call request from the called terminal, determining customized ring signal media resource information based on the provisional response, sending a first media session update message that carries the customized ring signal media resource information to the called terminal, receiving a first response from the called terminal, and playing the multimedia customized ringing signal based on the first response. The initial call request includes session description protocol (SDP) information of the calling terminal, and the first response includes a result of customized ringing signal media
(Continued)

resource negotiation between the application server and the called terminal.

20 Claims, 9 Drawing Sheets

Related U.S. Application Data continuation of application No. PCT/CN2020/078949, filed on Mar. 12, 2020.

(58) Field of Classification Search
CPC ............. H04L 65/1096; H04L 65/1104; H04L 65/1016
See application file for complete search history.

(56) References Cited

U.S. PATENT DOCUMENTS

| | | | |
|---|---|---|---|
| 8,923,796 B2 | 12/2014 | Stucker | |
| 2010/0233997 A1 | 9/2010 | Hou | |
| 2012/0120877 A1* | 5/2012 | Stucker | H04L 65/1069 370/328 |
| 2012/0213346 A1* | 8/2012 | Gao | H04M 3/42017 379/93.01 |
| 2013/0034222 A1* | 2/2013 | Li | H04L 65/1016 379/207.16 |

FOREIGN PATENT DOCUMENTS

| | | |
|---|---|---|
| CN | 101111003 | 1/2008 |
| CN | 101141700 | 3/2008 |
| CN | 101227303 | 7/2008 |
| CN | 101409864 | 4/2009 |
| CN | 101409952 | 4/2009 |
| CN | 101753517 | 6/2010 |
| CN | 101754489 | 6/2010 |
| CN | 101795330 | 8/2010 |
| CN | 102131158 | 7/2011 |
| CN | 102143280 | 8/2011 |
| CN | 102404295 | 4/2012 |
| CN | 103209242 | 7/2013 |
| CN | 101931617 | 12/2013 |
| EP | 2479968 | 7/2012 |
| EP | 3148228 | 3/2017 |
| WO | 2010054558 | 5/2010 |

OTHER PUBLICATIONS

3GPP TS 24.183 V15.0.0 (Jun. 2018),"3rd Generation Partnership Project; Technical Specification Group Core Network and Terminals; IP Multimedia Subsystem (IMS) Customized Ringing Signal (CRS); Protocol specification (Release 15)," Jun. 2018, 59 pages.
3GPP TS 24.183 V9.4.0 (Jun. 2011), "3rd Generation Partnership Project; Technical Specification Group Core Network and Terminals; IP Multimedia Subsystem (IMS) Customized Ringing Signal (CRS); Protocol specification (Release 9)," Jun. 2011, 59 Pages.
3GPP TS 24.229 V16.1.0, "3rd Generation Partnership Project; Technical Specification Group Core Network and Terminals; IP multimedia call control protocol based on Session Initiation Protocol (SIP) and Session Description Protocol (SDP); Stage 3 (Release 16)," Mar. 2019, 1043 pages.
3GPP TS 24.628 V15.0.0 (Jun. 2018), "3rd Generation Partnership Project; Technical Specification Group Core Network and Terminals; Common Basic Communication procedures using IP Multimedia (IM)Core Network (CN) subsystem; Protocol specification (Release 15)," Jun. 2018, 60 pages.
Camarillo et al., "Early Media and Ringing Tone Generation in the Session Initiation Protocol (SIP)," Network Working Group, Request for Comments: 3960, Dec. 2004, 13 pages.
Camarillo et al., "Integration of Resource Management and SIP," Network Working Group, Request for Comments: 3312, Oct. 2002, 24 pages.
Ejzak, "Private Header (P-Header) Extension to the Session Initiation Protocol (SIP) for Authorization of Early Media," Network Working Group Request for Comments: 5009, Sep. 2007, 15 pages.
Extended European Search Report issued in European Application No. 20778312.7 on Jan. 31, 2022, 15 pages.
Office Action issued in Chinese Application No. 201910892751.1 on Aug. 31, 2021, 12 pages (with English translation).
Office Action issued in Chinese Application No. 202011029516.0 on Apr. 29, 2021, 12 pages (with English translation).
Office Action issued in Chinese Application No. 202011029516.0 on Feb. 24, 2021, 24 pages (with English translation).
Office Action issued in Chinese Application No. 202011029516.0 on Jul. 16, 2021, 6 pages (with English translation).
PCT International Search Report and Written Opinion issued in International Application No. PCT/CN2020/078949 on May 27, 2020, 15 pages (with English translation).
Rosenberg et al., "SIP: Session Initiation Protocol," Network Working Group Request for Comments: 3261, Jun. 2002, 269 pages.
Rosenberg, "The Session Initiation Protocol (SIP) Update Method," Network Working Group, Request for Comments: 3311, Sep. 2002, 13 pages.
Winett, "Level III Server Protocol for the Lincoln Laboratory 360/67 Host," Network Working Group Request for Comments: 109, Mar. 24, 1971, 13 pages.

* cited by examiner

METHOD FOR PLAYING MULTIMEDIA CUSTOMIZED RINGING SIGNAL AND CUSTOMIZED ALERTING TONE, AND APPLICATION SERVER

CROSS-REFERENCE TO RELATED APPLICATIONS

This application is a continuation of U.S. patent application Ser. No. 17/487,864, filed on Sep. 28, 2021, which is continuation of International Application No. PCT/CN2020/078949, filed on Mar. 12, 2020, which claims priority to Chinese Patent Application No. 201910245356.4, filed on Mar. 28, 2019, and Chinese Patent Application No. 201910892751.1, filed on Sep. 20, 2019. All of the aforementioned patent applications are hereby incorporated by reference in their entireties.

TECHNICAL FIELD

This application relates to the field of communications technologies, and in particular, to a method for playing a multimedia customized ringing signal and customized alerting tone, and an application server.

BACKGROUND

With introduction of voice over long term evolution (voice over long term evolution, VoLTE), voice call quality is significantly improved compared with that in 2G and 3G eras, and VoLTE can provide high-definition voice and video calls. As a terminal device, a core network capability, and the like are upgraded, services such as a high-definition audio customized alerting tone and a high-definition video customized alerting tone emerge. A called terminal may play a customized ringing signal (customized ringing signal, CRS), at a ringing stage.

Currently, a customized ringing signal service is usually implemented in an "early session" mode or a "download and play" mode. In the "early session" mode, both a terminal device and a customized ringing signal application server need to support the "early session" mode. Currently, the terminal device and the customized ringing signal application server have a low support rate for the "early session" mode. In addition, during customized ringing signal media resource negotiation between the terminal device and the customized ringing signal application server, a new session needs to be established to perform the customized ringing signal media resource negotiation, and therefore a relatively large quantity of network resources need to be occupied. Consequently, in the conventional technology, using the "early session" mode in the customized ringing signal service is unfavorable to development of the customized ringing signal service. In the "download and play" mode, a called terminal plays customized ringing signal content after downloading a multimedia customized ringing signal. This mode highly depends on the called terminal. In addition, the called terminal may shield playing of the multimedia customized ringing signal. Consequently, the customized ringing signal application server lacks management and control over the customized ringing signal service. This is unfavorable to development of the customized ringing signal service either.

SUMMARY

This application provides a method for playing a multimedia customized ringing signal and customized alerting tone, and an application server, to implement playing of a multimedia customized ringing signal, and help improve development of a multimedia customized ringing signal service.

According to a first aspect, this application provides a method for playing a multimedia customized ringing signal. The method includes: An application server receives an initial call request from a calling terminal, and sends the initial call request to a called terminal; receives a provisional response to the initial call request from the called terminal; determines customized ring signal media resource information based on the provisional response; sends a first media session update message that carries the customized ring signal media resource information to the called terminal; receives a first response from the called terminal; and plays back the multimedia customized ringing signal for the called terminal based on the first response, where the initial call request includes session description protocol (SDP) information of the calling terminal, and the first response includes a result of customized ringing signal media resource negotiation between the application server and the called terminal.

Based on this solution, after the initial call request is sent to the application server, when the called terminal rings, the application server starts and completes the customized ringing signal media resource negotiation with the called terminal, and then the application server plays back the multimedia customized ringing signal for the called terminal. In this way, the customized ringing signal media resource negotiation between the application server and the called terminal and call media resource negotiation to be performed between the calling terminal and the called terminal are implemented in a same session. This may also be understood as: Based on the solution of this application, during the customized ringing signal media resource negotiation between the called terminal and the application server, a new session does not need to be created, instead, a session for the call media resource negotiation between the calling terminal and the called terminal may be changed, to help save network resources. Further, when the application server plays back the multimedia customized ringing signal for the called terminal, the called terminal does not need to download customized ringing signal content before playing the customized ringing signal content, and the called terminal cannot shield the customized ringing signal content. Therefore, the application server can manage and control a customized ringing signal service in real time, to help develop the customized ringing signal service.

In a possible implementation, after the application server determines that resource reservation is locally completed, and determines that the called terminal completes resource reservation, the application server plays back the multimedia customized ringing signal for the called terminal based on the first response, to help improve user experience and a success rate of playing the multimedia customized ringing signal by the application server for the called terminal.

In a possible implementation, the application server determines customized alerting tone early media information based on the initial call request, sends a second media session update message that includes the customized alerting tone early media information to the calling terminal, and receives a second response from the calling terminal. The application server plays back a multimedia customized alerting tone for the called terminal based on the second response, where the second response includes a result of customized alerting tone media resource negotiation between the application server and the calling terminal. In the method, the application server can implement a function of playing both the multimedia customized alerting tone and the multimedia customized ringing signal, to improve user's perception of a customized alerting tone service, enhance stickiness of the customized alerting tone service and the customized ringing signal service, and help develop the customized ringing signal service and the customized alerting tone service.

In a possible implementation, the application server may add service information of a customized alerting tone in a multimedia form to a provisional response, and send, to the calling terminal, the provisional response to which the service information of the customized alerting tone in the multimedia form is added. In this manner, after receiving the provisional response, the calling terminal can obtain customized alerting tone service content in the multimedia form based on the service information that is of the customized alerting tone in the multimedia form and that is added to the provisional response. The customized alerting tone service content in the multimedia form can be used in application scenarios such as user operation reminding, service notification, advertising propaganda, a holiday special effect, and personalized information push. This can further enrich service content of a customized alerting tone service and improve interactive operation experience.

In a possible implementation, the application server adds the service information of the customized alerting tone in the multimedia form to an Alert-Info header field of the provisional response; and/or the application server adds the service information of the customized alerting tone in the multimedia form to a Call-Info header field of the provisional response.

In a possible implementation, the application server adds service information of a customized ringing signal in a multimedia form to an initial call request, and sends, to the called terminal, an initial call request to which the service information of the customized ringing signal in the multimedia form is added. Based on this manner, after receiving the initial call request, the called terminal can obtain customized ringing signal service content in the multimedia form based on the service information that is of the customized ringing signal in the multimedia form and that is added to the initial call request. The customized ringing signal service content in the multimedia form can be used in application scenarios such as user operation reminding, service notification, advertising propaganda, a holiday special effect, and personalized information push. This can further enrich service content of a customized ringing signal service and improve interactive operation experience.

In a possible implementation, the application server adds the service information of the customized ringing signal in the multimedia form to an Alert-Info header field of the initial call request; and/or the application server adds the service information of the customized ringing signal in the multimedia form to a Call-Info header field of the initial call request.

The application server may stop playback of the multimedia customized ringing signal and/or the multimedia customized alerting tone based on the following three implementations.

Implementation 1: After receiving an off-hook response from the called terminal, the application server stops playback of the multimedia customized ringing signal and/or the multimedia customized alerting tone.

Implementation 2: After receiving an on-hook message from the calling terminal, the application server stops playback of the multimedia customized ringing signal and/or the multimedia customized alerting tone.

Implementation 3: After receiving an on-hook message from the called terminal, the application server stops playback of the multimedia customized ringing signal and/or the multimedia customized alerting tone.

In a possible implementation, the application server triggers call media renegotiation between the calling terminal and the called terminal, so that a call can be normally connected between the calling terminal and the called terminal.

In a possible implementation, the application server adds indication information indicating that a network side plays back the multimedia customized ringing signal for the called terminal to the Alert-Info header field of the initial call request, and sends, to the called terminal, the initial call request to which the indication information is added. In this manner, after receiving the initial call request, the called terminal can determine, based on the indication information that indicates that the network side plays back the multimedia customized ringing signal for the called terminal and that is added to the initial call request, that the network side plays back the multimedia customized ringing signal for the called terminal. Therefore, the called terminal does not play a local ringing tone after sending a 180 message, to avoid interference to playing of the multimedia customized ringing signal. Alternatively, after the called terminal sends a 180 message, the called terminal plays a local ringing tone if the called terminal still does not receive, within a preset time, a multimedia customized ringing signal media stream and/or the first media session update message that carries the customized ring signal media resource information.

According to a second aspect, this application provides a method for playing a multimedia customized ringing signal. The method includes: A called terminal receives an initial call request from a calling terminal, sends a provisional response to the initial call request to an application server, receives a first media session update message that includes customized ring signal media resource information from the application server, and sends a first response to the first media session update message to the application server, where the first response includes a result of customized ringing signal media resource negotiation between the application server and the called terminal, the initial call request includes SDP information of the calling terminal, and the customized ring signal media resource information is determined by the application server based on the provisional response.

Based on this solution, after the initial call request is sent to the application server, when the called terminal rings, the application server starts and completes the customized ringing signal media resource negotiation with the called terminal, and then the application server plays back the multimedia customized ringing signal for the called terminal. In this way, the customized ringing signal media resource negotiation between the application server and the called terminal and call media resource negotiation to be performed between the calling terminal and the called terminal are implemented in a same session. This may also be understood as: Based on the solution of this application, during the customized ringing signal media resource negotiation between the called terminal and the application server, a new session does not need to be created, instead, a session for the call media resource negotiation between the calling terminal and the called terminal may be changed, to help save network resources. Further, when the application server plays back the multimedia customized ringing signal for the called terminal, the called terminal does not need to download customized ringing signal content before playing the customized ringing signal content, and the called terminal cannot shield the customized ringing signal content. Therefore, the application server can manage and control a customized ringing signal service in real time, to help develop the customized ringing signal service.

In a possible implementation, the called terminal determines that resource reservation is locally completed, and sends a media session update message to the application server, where the media session update message is used to indicate that the called terminal completes the resource reservation, so that the application server determines that the called terminal completes the resource reservation.

In a possible implementation, the called terminal receives, from the application server, an initial call request to which service information of a customized ringing signal in a multimedia form is added, and obtains customized ringing signal service content in the multimedia form based on the service information that is of the customized ringing signal in the multimedia form and that is in the initial call request. The called terminal plays the customized ringing signal service content in the multimedia form when determining that the application server plays back the multimedia customized ringing signal for the called terminal. Based on this manner, after receiving the initial call request, the called terminal can obtain the customized ringing signal service content in the multimedia form based on the service information that is of the customized ringing signal in the multimedia form and that is added to the initial call request. The customized ringing signal service content in the multimedia form can be used in application scenarios such as user operation reminding, service notification, advertising propaganda, a holiday special effect, and personalized information push. This can further enrich service content of a customized ringing signal service.

In a possible implementation, the called terminal obtains the customized ringing signal service content in the multimedia form based on the service information that is of the customized ringing signal in the multimedia form and that is in an Alert-Info header field of the initial call request. In another possible implementation, the called terminal obtains the customized ringing signal service content in the multimedia form based on the service information that is of the customized ringing signal in the multimedia form and that is in a Call-Info header field of the initial call request.

In a possible implementation, the called terminal performs call media renegotiation with the calling terminal, so that a call can be normally connected between the calling terminal and the called terminal.

In a possible implementation, the Alert-Info header field of the initial call request received by the called terminal carries indication information indicating that a network side plays back the multimedia customized ringing signal for the called terminal. The called terminal does not play a local ringing tone based on the indication information after sending a 180 message. Alternatively, after the called terminal sends a 180 message, the called terminal plays a local ringing tone based on the indication information if the called terminal still does not receive, within a preset time, a customized ringing signal multimedia stream and/or the first media session update message that carries the customized ring signal media resource information that are/is sent by the network side.

According to a third aspect, a calling terminal receives a second media session update message from an application server, and the calling terminal sends a second response to the second media session update message to the application server, where the second media session update message includes customized alerting tone early media information, and the second response includes a result of customized alerting tone media resource negotiation between the application server and the calling terminal.

In a possible implementation, the calling terminal receives, from the application server, a provisional response to which service information of a customized alerting tone in a multimedia form is added, and the calling terminal may obtain customized alerting tone service content in the multimedia form based on a Call-Info header field and/or an Alert-Info header field of the provisional response to which the service information of the customized alerting tone in the multimedia form is added. The customized alerting tone service content in the multimedia form can be used in application scenarios such as user operation reminding, service notification, advertising propaganda, a holiday special effect, and personalized information push. This can further enrich service content of a customized alerting tone service and improve interactive operation experience.

According to a fourth aspect, this application provides an application server. The application server includes a processor and a transceiver. Optionally, the application server may further include a memory. When the application server includes the memory, the memory is configured to store instructions. The processor is configured to: execute the instructions stored in the memory, and control the transceiver to receive and send signals. When the processor executes the instructions stored in the memory, the application server may be configured to perform the method according to any one of the first aspect or the possible implementations of the first aspect.

In a possible implementation, the memory may further store multimedia playback setting data, multimedia customized ringing signal content, multimedia customized alerting tone content, and the like.

According to a fifth aspect, this application provides an application server, configured to implement the method according to any one of the first aspect or the possible implementations of the first aspect, and including corresponding functional modules respectively configured to implement the steps in the foregoing method. A function may be implemented by hardware, or may be implemented by hardware by executing corresponding software. The hardware or the software includes one or more modules corresponding to the function.

In a possible implementation, a structure of the application server includes a processing unit and a transceiver unit. These units may perform corresponding functions in the foregoing method example. For details, refer to the detailed descriptions in the method example. Details are not described herein again.

According to a sixth aspect, an embodiment of this application provides a communications apparatus. The communications apparatus has a function of implementing the called terminal in the foregoing embodiment, or may have a function of implementing the calling terminal in the foregoing embodiment. The function may be implemented by hardware, or may be implemented by hardware by executing corresponding software. The hardware or the software includes one or more units or modules corresponding to the foregoing function.

In a possible implementation, the communications apparatus may be a terminal, or a component that may be used in a terminal, for example, a chip, a chip system, or a circuit. The communications apparatus may include a transceiver and a processor. The processor may be configured to support the communications apparatus in performing a corresponding function of the foregoing calling terminal, or may be configured to support the communications apparatus in performing a corresponding function of the foregoing called terminal. The transceiver is configured to support the communications apparatus in communicating with an application server or another communications apparatus. Optionally, the communications apparatus may further include a memory. The memory may be coupled to the processor, and the memory stores program instructions and data that are necessary for the communications apparatus. The transceiver may be an independent receiver, an independent transmitter, a transceiver integrated with a transceiver function, or an interface circuit.

In a possible implementation, the communications apparatus may further include an input/output (I/O) interface. The I/O interface is configured to connect to a device that plays multimedia content.

In another possible implementation, the communications apparatus may further include a device that plays multimedia content.

According to a seventh aspect, an embodiment of this application provides a communications apparatus, configured to implement the method according to any one of the second aspect or the possible implementations of the second aspect, and including corresponding functional modules respectively configured to implement the steps in the foregoing method. A function may be implemented by hardware, or may be implemented by hardware by executing corresponding software. The hardware or the software includes one or more modules corresponding to the function.

In a possible implementation, when the communications apparatus is a terminal, the communications apparatus may include a processing unit and a transceiver unit. These units may perform corresponding functions of the terminal in the foregoing method example. For details, refer to the detailed descriptions in the method example. Details are not described herein again.

According to an eighth aspect, an embodiment of this application provides a communications system. The communications system includes an application server and a communications apparatus. The application server may be configured to perform the method according to any one of the first aspect or the possible implementations of the first aspect, and the communications apparatus may be configured to perform the method according to any one of the second aspect or the possible implementations of the second aspect.

According to a ninth aspect, this application provides a chip system, including a processor. Optionally, the chip system may further include a memory. The memory is configured to store a computer program, and the processor is configured to: invoke the computer program from the memory and run the computer program, so that an application server on which the chip system is installed performs the method according to any one of the first aspect or the possible implementations of the first aspect, or a communications apparatus on which the chip system is installed performs the method according to any one of the second aspect or the possible implementations of the second aspect.

According to a tenth aspect, an embodiment of this application provides a computer storage medium. The computer storage medium stores instructions, and when the instructions are run on a computer, the computer is enabled to perform the method according to any one of the first aspect or the possible implementations of the first aspect, or the computer is enabled to perform the method according to any one of the second aspect or the possible implementations of the second aspect.

According to an eleventh aspect, an embodiment of this application provides a computer program product including instructions. When the computer program product runs on a computer, the computer is enabled to perform the method according to any one of the first aspect or the possible implementations of the first aspect, or the computer is enabled to perform the method according to any one of the second aspect or the possible implementations of the second aspect.

DESCRIPTION OF EMBODIMENTS

Figure 1:
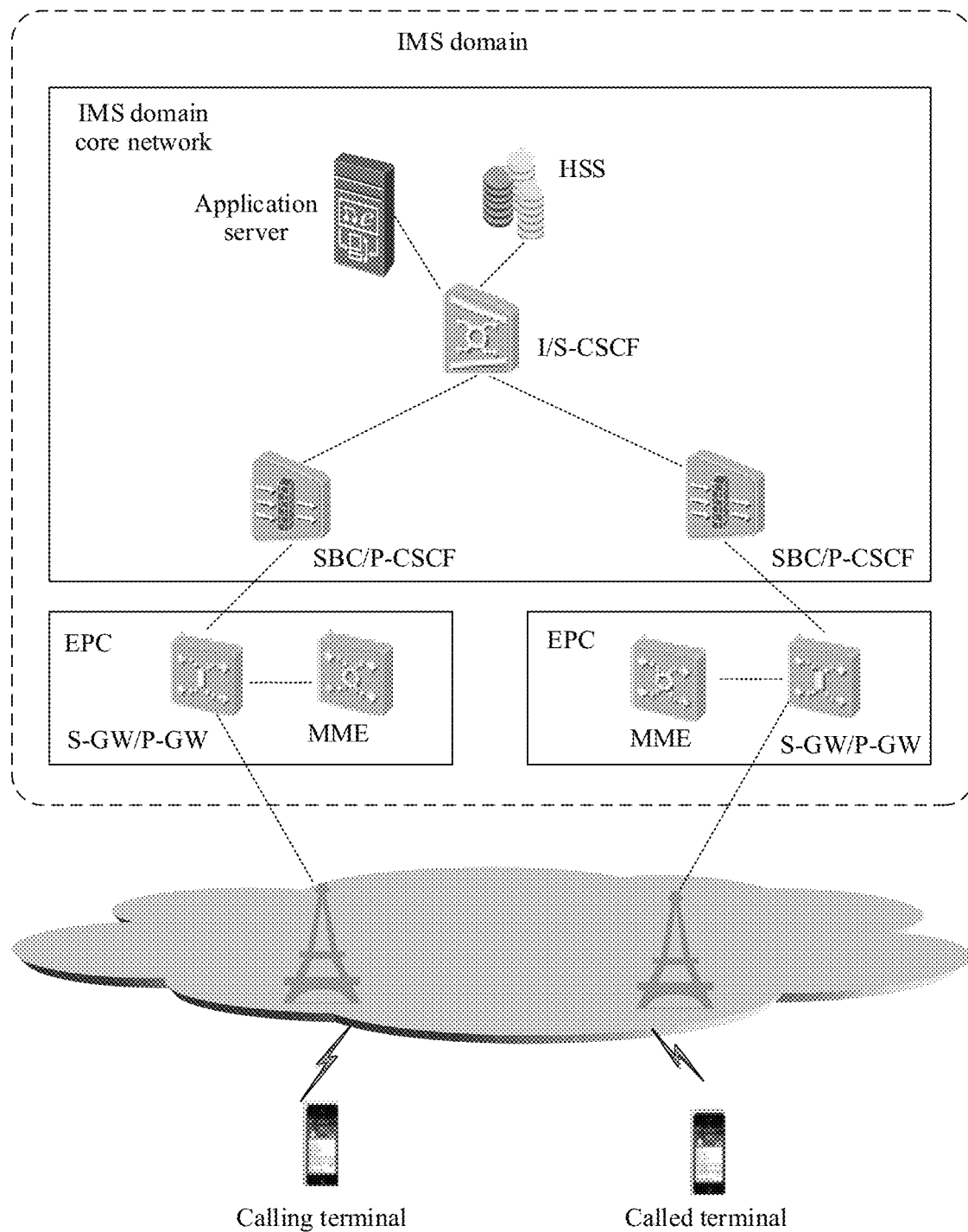
FIG. 1 is a schematic architectural diagram of a communications system according to this application.

To make the objectives, technical solutions, and advantages of this application clearer, the following describes basic concepts in this application.

1. Initial Filter Criteria (Initial Filter Criteria, iFC)

iFC: The iFC includes routing information of an application server (application server, AS) that provides a service for a terminal, for example, routing information of a customized ringing signal application server and routing information of a customized alerting tone application server. When the terminal registers or initiates a call, the terminal may trigger the AS based on evaluation of the iFC, and send a message to the AS, so that the AS provides a corresponding service (such as registration or a call) for the terminal. Partial user subscription data in a home subscriber server (home subscriber server, HSS) is stored in the iFC. When the terminal registers, the partial user subscription data is downloaded to a serving-call session control function (serving-call session control function, S-CSCF) network element allocated to the terminal. The iFC may define a service trigger condition and a target AS based on different priorities. When processing a service request from the terminal, the S-CSCF performs iFC matching check. If the trigger condition is met, a specified AS is triggered, so that the AS can control the service based on specified service logic in the AS.

2. Media Resource Negotiation

Media resource negotiation: A calling terminal and a called terminal need to agree on multimedia information in a session establishment process. Therefore, the multimedia information may be negotiated by using a session description protocol (session description protocol, SDP) request and response mechanism. The media information includes but is not limited to a media type and a coding scheme. The media type includes video, audio, text, or the like. One media type may correspond to a plurality of coding schemes. For example, coding schemes corresponding to the audio include pulse code modulation (pulse code modulation, PCM) and moving picture experts group audio layer-3 (moving picture experts group audio layer-3, MP3), and coding schemes corresponding to the video include a moving picture experts group (moving picture experts group, MPEG), H.261, H.263, and H.264.

3. SIP Message

SIP message: The SIP message is used to create, modify, or release one or more sessions between terminals.

There may be the following two types of SIP messages.

Type 1: Request Message

Common request messages include: (1) INVITE: A session invitation request (also referred to as a call request) is initiated to invite a user to join a session, where a session description is included in a message body. For a two-party call, a calling terminal indicates, in the session description, media information (for example, a media type and a parameter of the media type) that can be accepted by the calling terminal. A called terminal indicates, in a message body of a success response message, media information that the called terminal expects to accept, and may also indicate media information to be sent by the called terminal. INVITE includes two parts: a message header and a data area. The message header includes information such as address information of the calling terminal and the called terminal, a call subject, and a call priority. The data area includes session media information, which may be implemented by using a session description protocol (session description protocol, SDP). The SDP includes a media type (video, audio, text, or the like), a transport protocol (real-time transport protocol (real-time transport protocol, RTP), a user datagram protocol (user datagram protocol, UDP), IP, H.320, or the like), a media format (MP3 audio, MPEG video, or the like), multicast or remote (unicast) address and port, and the like.

(2) ACK: The ACK is an acknowledgement message, and is used to acknowledge that a final response to the INVITE message has been received, where the message corresponds to the INVITE message.

(3) PRACK: The PRACK is a provisional acknowledgment/response, and a function of the PRACK is similar to the function of the ACK.

(4) UPDATE: UPDATE is media session update information. To be specific, a session is modified without modifying a session status.

Type 2: Response Message

The response message includes: (1) a provisional response 1XX, indicating that the request message is being processed, where for example, 180 may indicate that the called terminal rings; in this case, a called terminal proxy has obtained a location of the called terminal and is reminding the called terminal, and the response may also be used to initiate a local ring back tone; and for another example, 183 represents a session progress (session progress) acknowledgement, and is used to prompt progress information for establishing a session; and (2) a final response 2XX, 3XX, 4XX, 5XX, or 6XX, where 2XX indicates that the request has been successfully received, fully understood, and accepted.

Before a method in this application is described, application scenarios in this application are further described first, to facilitate understanding of this solution. It may be noted that this part of content is also used as a part of optional content of this application.

Application scenario 1: Both a calling terminal and a called terminal may camp on a same IMS domain, and an application server may be disposed in the IMS domain.

Application scenario 2: A calling terminal and a called terminal each may camp on an IMS domain, the IMS domain on which the calling terminal camps may be referred to as a calling IMS domain, and the IMS domain on which the called terminal camps is referred to as a called IMS domain. In this scenario 2, an application server may be disposed in the calling IMS domain, or may be disposed in the called IMS domain.

Application scenario 3: A calling terminal camps on an IMS domain, and a called terminal camps on a CS domain. In this scenario 3, an application server may be disposed in the IMS domain.

Application scenario 4: A calling terminal camps on a CS domain, and a called terminal camps on an IMS domain. In this scenario 4, an application server may be disposed in the IMS domain.

For ease of description of the solution, descriptions are provided in the following embodiments by using an example in which both a calling terminal and a called terminal camp on a same IMS domain (that is, the application scenario 1) and access the IMS domain through a radio access network. The following further describes this application in detail with reference to the accompanying drawings.

FIG. 1 shows an example of a schematic architectural diagram of a communications system according to this application. The communications system may include a calling terminal, a called terminal, a radio access network, and an internet protocol (internet protocol, IP) multimedia subsystem (IP multimedia subsystem, IMS) domain network on a calling side and a called side. The IMS domain network on the calling side and the called side includes evolved packet cores (evolved packet core, EPC) and an IMS domain core network.

(1) The calling terminal and the called terminal each are a device with a wireless communication function. For example, the terminal may be a handheld device with a wireless communication function, a vehicle-mounted device, a wearable device (for example, including a smartwatch, a smart band, or a pedometer), a mobile internet device (mobile internet device, MID), a virtual reality (virtual reality, VR) terminal, an augmented reality (augmented reality, AR) terminal, an unmanned aerial vehicle device, a computing device, another processing device connected to a wireless modem, or a terminal in a 5G network or a future evolved network. In different networks, the terminal may have different names, for example, a terminal device, an access terminal, a subscriber unit, a subscriber station, a mobile station, a mobile console, a remote station, a remote terminal, a mobile device, a user terminal, user equipment, a wireless communications device, a user agent or a user apparatus, a cellular phone, a cordless telephone set, a session initiation protocol (session initiation protocol, SIP)

phone, a wireless local loop (wireless local loop, WLL) station, and a personal digital assistant (personal digital assistant, PDA).

(2) The radio access network mainly includes a network device. The network device may also be referred to as a radio access network (radio access network, RAN) device, and is a device that connects a terminal to a wireless network. The network device includes a network device in various communications standards, for example, including but not limited to a base station, a NodeB (NodeB, NB), an evolved NodeB (evolved NodeB, eNB), a transmission point or a transmission reception point (transmission reception point, TRP or TP), a radio network controller (radio network controller, RNC), a network device controller (base station controller, BSC), a network device transceiver station (base transceiver station, BTS), a home network device (for example, a home evolved NodeB, or a home NodeB, HNB), a baseband unit (baseband unit, BBU), a network device or a base station (for example, a gNB) in a 5G network, or a base station in a future evolved network. For example, the terminal may access an S/P-GW in a core network by using the network device in the access network.

(3) The EPC mainly includes a packet data network gateway (packet data network gateway, PGW), a serving gateway (serving gateway, SGW), and a mobility management entity (mobility management entity, MME). The S-GW is a device connected to a radio access network (radio access network, RAN), and is mainly used for functions such as a user plane bearer from a terminal to a core network, data buffering when the terminal is in an idle mode, initiation of a service request on a network side, lawful interception, and packet data routing and forwarding. The P-GW is a mobility anchor in a 3rd generation partnership project (3rd generation partnership project, 3GPP) access network, and is mainly configured to be responsible for functions such as assignment of a user internet protocol (internet protocol, IP) address, charging, packet filtering, and policy control. The MME is mainly configured to perform mobility management, evolved packet system (evolved packet system, EPS) bearer control, and the like for a user, for example, perform functions such as location registration and temporary identifier allocation, public data network (public data network, PDN) connection and bearer maintenance, and session management such as creation, modification, and deletion. The P-GW and the S-GW may be integrated together, and may be briefly referred to as "S/P-GW".

(4) The IMS domain core network mainly includes a session border controller (session border controller, SBC), a proxy-call session control function (proxy-call session control function, P-CSCF) network element, an interrogating-call session control function (interrogating-call session control function, I-CSCF) network element, an S-CSCF network element, an HSS, and at least one application server, for example, a customized ringing signal application server (customized ringing signal application server, CRS AS) and a customized alerting tone application server (customized alerting tone application server, CAT AS). The SBC is located at a border of the IMS domain, and is mainly configured to: connect a terminal to an IMS network and process a media resource. The P-CSCF network element is an ingress node that connects the terminal to the IMS network. From a perspective of SIP, the P-CSCF network element is an outbound/inbound SIP proxy server. SIP signaling of the terminal needs to pass through the P-CSCF, and the P-CSCF routes a request of the terminal to a correct I-CSCF. The I-CSCF network element is a contact point in a carrier network, namely, an initial entry point in the IMS network. All terminals are connected to the carrier network by using the entity. The I-CSCF can route a SIP request from another network to the S-CSCF. The S-CSCF network element is a central node in the IMS core network, and is mainly used for terminal registration, authentication control, session routing, service trigger control, maintenance of session status information, and the like. The customized ringing signal application server is mainly configured to: provide multimedia customized ringing signal service logic, and play a multimedia customized ringing signal. For example, the customized ringing signal application server may interact with the S-CSCF to implement call control on a service and execute the customized ringing signal service logic. The HSS is configured to: store user subscription information, and record a user identity, registration information, an access parameter, and service triggering information. The customized alerting tone application server is configured to: provide multimedia customized alerting tone service logic, and play a multimedia customized alerting tone. The I-CSCF and the S-CSCF may be integrated together, and may be briefly referred to as "I/S-CSCF". The SBC and the P-CSCF may be integrated together, and may be briefly referred to as "SBC/P-CSCF".

It may be understood that the foregoing descriptions do not constitute a limitation on the architectural diagram of the system in this embodiment of the present invention, and the architectural diagram of the system in this embodiment of the present invention includes but is not limited to the system shown in FIG. 1.

It may be noted that the application server may be used as an independent network element, or may be an application server in an existing service. For example, that the customized alerting tone application server plays customized ringing signal audio and/or video content may mean that the customized alerting tone application server implements a function of the application server. Alternatively, the customized ringing signal application server and the customized alerting tone application server may be integrated together to implement a function of the application server. When the customized ringing signal application server and the customized alerting tone application server are integrated together, both a function of playing customized ringing signal audio and/or video content and a function of playing a multimedia customized alerting tone may be implemented. The application server may include a function of a multimedia resource function (Multimedia Resource Function, MRF) server, and may also cooperate with the MRF server as two independent network elements.

A customized ringing signal service may be subscribed to by a calling party, may be subscribed to by a called party, or may be subscribed to together with another service (for example, a customized alerting tone CAT service). Specifically, based on a service requirement, a carrier may select a service subscription entity and select whether the customized ringing signal service is to be subscribed to together with the another service. This is not limited in this application.

To simplify descriptions and facilitate understanding, some network elements such as an S-GW/P-GW, an SBC/P-CSCF, and an I-CSCF/S-CSCF in signaling interaction are not shown in the following embodiments.

Figure 2:
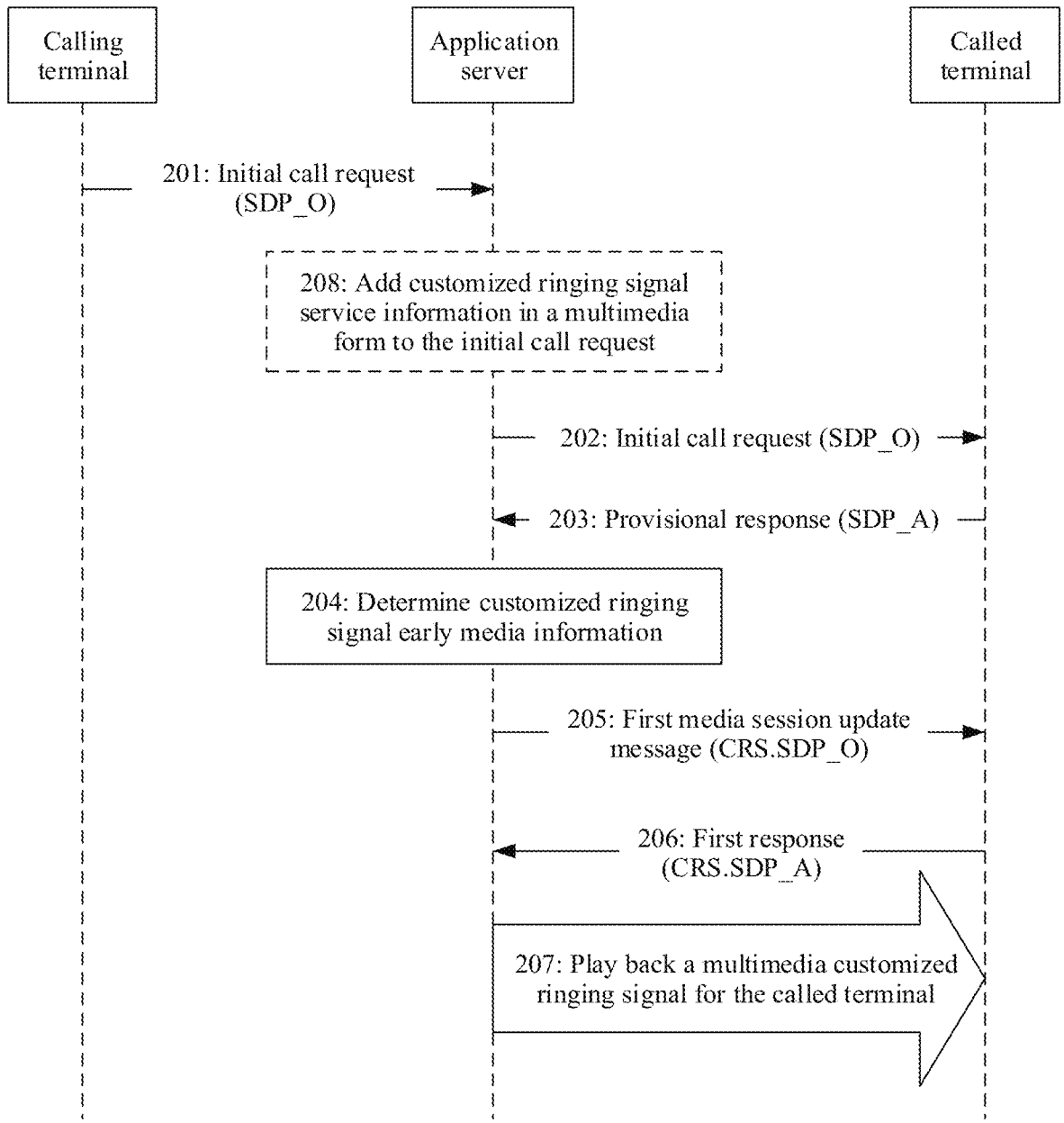
FIG. 2 is a schematic flowchart of a method for playing a multimedia customized ringing signal according to this application.

Based on the foregoing content, FIG. 2 shows an example of a schematic flowchart of a method for playing a multimedia customized ringing signal according to this application. In this embodiment, an application server may be the application server in FIG. 1, and the application server can play the multimedia customized ringing signal; a calling terminal may be the calling terminal in FIG. 1; and a called terminal may be the called terminal in FIG. 1. The method includes the following steps.

Step 201: The calling terminal sends an initial call request (INVITE) to the application server.

The initial call request includes session description protocol (session description protocol, SDP) information (SDP_O) of the calling terminal, and the SDP information (SDP_O) of the calling terminal includes but is not limited to a call type, numbers of a calling party and a called party, media types and coding schemes supported by the calling party, and the like. The initial call request is used to perform call media resource negotiation between the calling terminal and the called terminal.

Step 202: The application server sends, to the called terminal, the initial call request received from the calling terminal.

Herein, the application server may forward the initial call request to the called terminal.

Step 203: After receiving the initial call request, the called terminal sends a provisional response to the initial call request to the application server.

Correspondingly, the application server receives the provisional response to the initial call request from the called terminal.

Herein, the provisional response may carry SDP information (SDP_A) of the called terminal. This means that the provisional response carries call media information supported by the called terminal.

In a possible implementation, if both the calling terminal and the called terminal complete resource reservation in a precondition procedure, the provisional response is a 180 message, and the 180 message includes the SDP information (SDP_A) of the called terminal.

In another possible implementation, if the calling terminal and/or the called terminal do/does not complete resource reservation in a precondition procedure, the provisional response is a 183 message or a 180 message, and the 183 message carries the SDP information (SDP_A) of the called terminal. After the calling terminal completes the resource reservation and notifies the called terminal, and the called terminal completes the resource reservation, the called terminal further needs to send the 180 message to the application server, to notify the application server that the called terminal completes the resource reservation.

In still another possible implementation, if the provisional response is a 180 message in a non-precondition procedure, the 180 message may not carry the SDP information (SDP_A) of the called terminal. Optionally, the session description protocol information (SDP_A) of the called terminal may alternatively be carried in a subsequent off-hook response of the called terminal (as described in step 418 in FIG. 4A).

Step 204: The application server determines customized ringing signal early media (P-early-media, PEM) information based on the provisional response.

In a possible implementation, the customized ring signal media resource information (CRS.SDP_O) may be determined based on whether a Contact header field of the provisional response (for example, the 180/183 message) of the called terminal supports audio or supports audio and video.

Step 205: The application server sends a first media session update message (first UPDATE) to the called terminal.

The first media session update message includes the customized ring signal media resource information. For example, the customized ring signal media resource information may be carried in a PEM header field of the first media session update message, or may be carried in an Alert-Info header field of the first media session update message. This is not limited in this application. In addition, the first media session update message may carry the PEM header field, the Alert-Info header field, or the like to indicate the called terminal, and the first media session update message is used to perform customized ringing signal media resource negotiation.

In a possible implementation, the application server sends the first media session update information to the called terminal when resource reservation is locally completed.

Step 206: After receiving the first media session update message from the application server, the called terminal sends a first response to the first media session update message to the application server.

Herein, after receiving the first media session update message, the called terminal determines the first response. The first response includes a result (CRS. SDP_A) of customized ringing signal media resource negotiation between the application server and the called terminal.

Correspondingly, the application server receives the first response from the called terminal.

In a possible implementation, if the called terminal does not complete the resource reservation in the precondition procedure, after the called terminal sends the first response to the application server, when the called terminal completes the resource reservation, the called terminal needs to send UPDATE to the application server, so that the application server determines that the called terminal completes the resource reservation.

It may be noted that in the precondition procedure, when sending the first response to the application server, the called terminal may also determine that the called terminal completes the resource reservation. To be specific, the first response may also indicate that the called terminal completes the resource reservation. In this way, the application server can determine that the called terminal completes the resource reservation.

In another possible implementation, in a non-precondition procedure, only customized ringing signal media resource negotiation between the application server and the called terminal may be completed, and there is no need to determine whether the called terminal completes the resource reservation.

In a possible implementation, the application server may alternatively use a non-resource reservation policy. To be specific, the application server does not need to determine whether the called terminal completes the resource reservation.

Step 207: The application server plays back the multimedia customized ringing signal for the called terminal based on the first response.

In a possible implementation, the application server enables, based on the first response, the called terminal to play the multimedia customized ringing signal. For example, the application server indicates an MRF server to provide the multimedia customized ringing signal for being played by the called terminal.

In a possible implementation, when the application server determines that the resource reservation is locally completed and determines that the called terminal completes the resource reservation, the application server may enable, based on the first response, the called terminal to play the multimedia customized ringing signal. For example, the first response is a success response (200) to the first media session update message. After receiving the success response (200), the application server plays back the multimedia customized ringing signal for the called terminal.

With reference to FIG. 1, both a message transmitted between the application server and the calling terminal and a message transmitted between the application server and the called terminal may be forwarded through the S-CSCF. For example, in step 201, the application server may first forward the initial call request to the S-CSCF, and the S-CSCF forwards the initial call request to the called terminal. For another example, in step 202, the calling terminal may first send the initial call request to the S-CSCF, and the S-CSCF forwards the initial call request to the application server. Details are not described herein.

It can be learned from step 201 to step 207 that based on this solution, after the initial call request is sent to the application server, when the called terminal rings, the application server starts and completes the customized ringing signal media resource negotiation with the called terminal, and then the application server plays back the multimedia customized ringing signal for the called terminal. In this way, the customized ringing signal media resource negotiation between the application server and the called terminal and call media resource negotiation to be performed between the calling terminal and the called terminal are implemented in a same session. This may also be understood as: Based on the solution of this application, during the customized ringing signal media resource negotiation between the called terminal and the application server, a new session does not need to be created, instead, a session for the call media resource negotiation between the calling terminal and the called terminal may be changed, to help save network resources. Further, when the application server plays back the multimedia customized ringing signal for the called terminal, the called terminal does not need to download customized ringing signal content before playing the customized ringing signal content, and the called terminal does not easily shield the customized ringing signal content. Therefore, the application server can manage and control a customized ringing signal service in real time. This helps develop the customized ringing signal service.

In a possible implementation, playing the multimedia customized ringing signal by the application server may replace a function such as a mobile phone ringtone or an incoming call show on a terminal side. Alternatively, the multimedia customized ringing signal may be played simultaneously with a mobile phone ringtone, an incoming call show, or the like on the terminal side.

It may be noted that in step 205, if the application server has a specific service setting or system problem, when sending the first media session update message, the application server may select audio media through negotiation to play an audio customized ringing signal, or may choose not to perform customized ringing signal media resource negotiation to cancel playing of the multimedia customized ringing signal.

It may be noted that in step 206, after the called terminal receives the first media session update message, the called terminal determines not to support the multimedia customized ringing signal service, and determines that the called terminal camps on a CS domain. When a proxy server (for example, a media gateway control function (media gateway control function, MGCF) network element) on the called terminal side disables customized ringing signal early media PEM and/or sets an audio/video media port to 0 in the first response, the application server needs to cancel playing of the multimedia customized ringing signal. Alternatively, when the called terminal chooses, based on a terminal capability, a network bearer, or the like, to disable a video media port in the first response, the application server may choose to play the audio customized ringing signal or cancel playing of the multimedia customized ringing signal.

It may be further noted that in step 203, in the non-precondition procedure, when the called terminal camps on the CS domain, the provisional response is also the 183 message or the 180 message.

In step 202, the application server may also add some information to the initial call request, and then send, to the called terminal, the initial call request to which the information is added. In a possible implementation, the application server may add service information of a customized ringing signal in a multimedia form to the initial call request (step 208 in FIG. 2), and sends, to the called terminal, an initial call request to which the service information of the customized ringing signal in the multimedia form is added. The called terminal obtains customized ringing signal service content in the multimedia form based on the service information that is of the customized ringing signal in the multimedia form and that is in the initial call request. The customized ringing signal service content in the multimedia form includes but is not limited to functions of improving a customized ringing signal service such as an external subtitle, a contact card, and a control.

It may be noted that after receiving the initial call request to which the service information of the customized ringing signal in the multimedia form is added, the called terminal may immediately obtain (for example, download) the customized ringing signal service content in the multimedia form; or may download the customized ringing signal service content in the multimedia form at another time before the customized ringing signal service content in the multimedia form is played. This is not limited in this application.

The application server adds the service information of the customized ringing signal in the multimedia form to the initial call request, so that after receiving the initial call request, the called terminal can obtain the customized ringing signal service content in the multimedia form based on the service information that is of the customized ringing signal in the multimedia form and that is added to the initial call request. The customized ringing signal service content in the multimedia form may be used in application scenarios such as user operation reminding, service notification, advertising propaganda, a holiday special effect, and personalized information push. This can further enrich service content of the customized ringing signal service and improve interactive operation experience. For example, when the service information of the customized ringing signal in the multimedia form is a web page, the web page may be directly operated (for example, tapped for browsing). When the service information of the customized ringing signal in the multimedia form is a control, the control may be directly operated.

Specifically, when the called terminal rings, the application server plays back the multimedia customized ringing signal for the called terminal, and the called terminal may play the downloaded customized ringing signal service content in the multimedia form such as an external subtitle, a contact card, and a control on time (for example, synchronously).

In a possible implementation, the application server may add the service information of the customized ringing signal in the multimedia form to an Alert-Info header field of the initial call request. Correspondingly, the called terminal obtains the customized ringing signal service content in the multimedia form based on the service information that is of the customized ringing signal in the multimedia form and that is in the Alert-Info header field of the initial call request. In another possible implementation, the application server adds the service information of the customized ringing signal in the multimedia form to a Call-Info header field of the initial call request. Correspondingly, the called terminal obtains the customized ringing signal service content in the multimedia form based on the service information that is of the customized ringing signal in the multimedia form and that is in the Call-Info header field of the initial call request. The application server may add the service information of the customized ringing signal in the multimedia form to the Alert-Info header field of the initial call request, and add the service information of the customized ringing signal in the multimedia form to the Call-Info header field of the initial call request. Correspondingly, the called terminal obtains the customized ringing signal service content in the multimedia form based on the service information that is of the customized ringing signal in the multimedia form and that is added to the Alert-Info header field of the initial call request and the service information that is of the customized ringing signal in the multimedia form and that is added to the Call-Info header field of the initial call request.

Herein, that the service information of the customized ringing signal may be the customized ringing signal service content may mean that the service information of the customized ringing signal is carried in a message body. After receiving the message body, the called terminal directly parses the message to obtain the customized ringing signal service content. The service information of the customized ringing signal may alternatively be a universal resource locator (universal resource locator, URL) of the customized ringing signal service content. After receiving the service information of the customized ringing signal, the called terminal locally downloads the customized ringing signal service content through the URL.

In a possible implementation, the calling terminal adds, to the Alert-Info header field of the initial call request, indication information indicating that a network side plays back the multimedia customized ringing signal for the called terminal. Alternatively, after receiving the initial call request sent by the calling terminal, the application server adds, to the Alert-Info header field of the initial call request, indication information indicating that a network side plays back the multimedia customized ringing signal for the called terminal, and sends, to the called terminal, the initial call request to which the indication information is added. That the network side plays back the multimedia customized ringing signal for the called terminal means that the application server plays back the multimedia customized ringing signal for the called terminal, and specifically includes that the application server indicates an MRF server to play the multimedia customized ringing signal. For example, the Alert-Info header field of the initial call request includes indication information: "urn:alert:service:crs".

Correspondingly, the called terminal receives the initial call request, where the Alert-Info header field of the initial call request carries the indication information indicating that the network side plays back the multimedia customized ringing signal for the called terminal. The called terminal does not play a local ringing tone based on the indication information after sending a 180 message. Alternatively, after the called terminal sends a 180 message, the called terminal plays a local ringing tone based on the indication information if the called terminal still does not receive, within a preset time, a customized ringing signal multimedia stream and/or the first media session update message that carries the customized ring signal media resource information that are/is sent by the network side. It may be noted that the 180 message may be the provisional response described above, may be the first response described above, or may be a second response sent by the called terminal after the called terminal sends the first response described above. This is not limited in this embodiment of this application.

Figure 3:
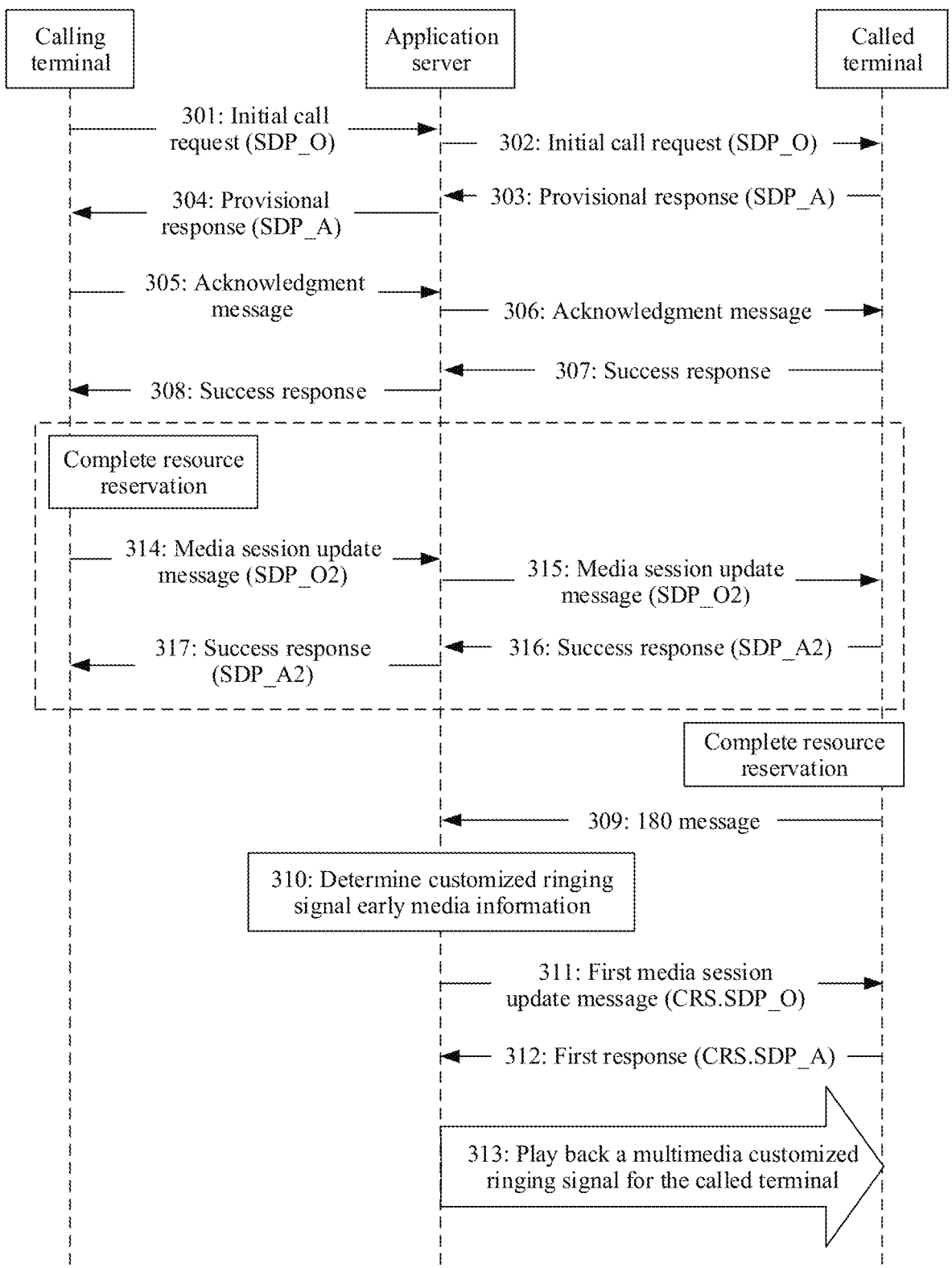
FIG. 3 is a schematic flowchart of another method for playing a multimedia customized ringing signal according to this application.

After step 203, the application server may further send, to the calling terminal, the provisional response from the called terminal. FIG. 3 is a schematic flowchart of another method for playing a multimedia customized ringing signal according to this application. In this embodiment, an application server may be the application server in FIG. 1, and the application server can play the multimedia customized ringing signal; a calling terminal may be the calling terminal in FIG. 1; and a called terminal may be the called terminal in FIG. 1. As shown in FIG. 3, the method includes the following steps.

Step 301: The calling terminal sends an initial call request (INVITE) to the application server.

For the step, refer to the descriptions of step 201. Details are not described herein again.

Step 302: The application server sends, to the called terminal, the initial call request received from the calling terminal.

For the step, refer to the descriptions of step 202. Details are not described herein again.

Step 303: After receiving the initial call request, the called terminal sends a provisional response to the initial call request to the application server.

For the step, refer to the descriptions of step 203. Details are not described herein again.

Step 304: The application server forwards, to the calling terminal, the provisional response from the called terminal.

Step 305: After receiving the provisional response, the calling terminal sends an acknowledgment (PRACK) message to the application server.

The acknowledgment (PRACK) message is used to notify the called terminal that the calling terminal receives the provisional response.

Step 306: After receiving the acknowledgment (PRACK) message, the application server sends the acknowledgment (PRACK) message to the called terminal.

Step 307: After receiving the acknowledgment (PRACK) message, the called terminal sends a success response (200) to the acknowledgment message to the application server.

Step 308: The application server sends the success response (200) to the calling terminal.

Step 305 to step 308 are used to acknowledge step 304.

Step 309: After determining that the calling terminal completes resource reservation and determining that resource reservation is also locally completed, the called terminal may send a 180 message to the application server.

Step 310: The application server determines customized ring signal media resource information based on the provisional response.

For the step, refer to the descriptions of step 204. Details are not described herein again.

Step 311: The application server sends a first media session update message (first UPDATE) to the called terminal.

For the step, refer to the descriptions of step 205. Details are not described herein again.

Step 312: After receiving the first media session update message from the application server, the called terminal sends a first response to the first media session update message to the application server.

For the step, refer to the descriptions of step 206. Details are not described herein again.

Step 313: The application server plays back the multimedia customized ringing signal for the called terminal based on the first response.

For the step, refer to the descriptions of step 207. Details are not described herein again.

The application server and the called terminal may determine completion of resource reservation in advance, to avoid a problem that the application server cannot successfully play the multimedia customized ringing signal for the called terminal because the called terminal or the application server does not complete the resource reservation. That the application server may complete the resource reservation in a process of any one of step 301 to step 310 may mean that the application server completes the resource reservation at any time between a time after the application server receives the initial call request from the calling terminal and a time before the application server sends the first media session update message to the called terminal. For example, the application server may complete the resource reservation after receiving the provisional response from the called terminal (that is, after step 303).

For the resource reservation of the called terminal, the following two scenarios may be included.

Scenario 1: After receiving the initial call request, the called terminal sends the provisional response to the initial call request to the application server, and the called terminal has indicated, in the provisional response, that the resource reservation is locally completed.

Scenario 2: After receiving the initial call request, the called terminal does not complete the resource reservation when sending the provisional response to the initial call request to the application server. In Scenario 2, in a possible implementation, the application server and the called terminal need to determine completion of the resource reservation. After step 307, and the called terminal determines that the calling terminal completes the resource reservation and determines that the resource reservation is also locally completed, customized ringing signal media resource negotiation between the application server and the called terminal may be performed. In other words, step 309 is first performed, and then step 310 to step 313 continue to be performed.

Further, for the resource reservation of the calling terminal that is similar to the resource reservation of the called terminal, the following two scenarios may also be included.

Scenario A: The resource reservation is completed when the calling terminal initiates the initial call request.

Scenario B: The resource reservation is not completed when the calling terminal initiates the initial call request. In Scenario B, the calling terminal and the called terminal need to determine completion of the resource reservation. After step 308, step 314 to step 317 may be first performed, then step 309 may be performed, and step 310 to step 313 may be performed.

Step 314: After completing the resource reservation, the calling terminal sends a media session update message (UPDATE) to the application server, so that the called terminal determines that the calling terminal completes the resource reservation.

The media session update message (UPDATE) carries SDP information (SDP_O2) of the calling terminal.

Step 315: The application server transparently transmits the media session update message (UPDATE) to the called terminal.

Step 316: After receiving the media session update message (UPDATE), the called terminal returns a success response (200) to the application server.

The success response (200) carries a result (SDP_A2) of media resource negotiation between the calling terminal and the called terminal and a result of local resource reservation of the called terminal.

Step 317: The application server transparently transmits the success response (200) to the calling terminal.

It may be noted that when neither the calling terminal nor the called terminal completes the resource reservation, the calling terminal notifies the called terminal after completing the resource reservation, and the called terminal sends the 180 message to the application server after receiving a message indicating that the calling terminal completes the resource reservation and determining that the resource reservation is locally completed, to indicate that both the called terminal and the calling terminal complete the resource reservation. This may also be understood as: When neither the calling terminal nor the called terminal completes the resource reservation, step 314 to step 317 are first performed, and then step 309 is performed.

In step 301 to step 317, the customized ringing signal media resource negotiation between the application server and the called terminal and call media resource negotiation to be performed between the calling terminal and the called terminal can be implemented in a same session, to help avoid a waste of network resources. In addition, the application server plays back the multimedia customized ringing signal for the called terminal, so that the application server can manage and control a customized ringing signal service in real time, to help develop the customized ringing signal service. Further, the application server starts to negotiate a media resource after determining that the called terminal completes the resource reservation and the resource reservation is locally completed, to help improve user experience and a success rate of playing the multimedia customized ringing signal.

Figure 4A:
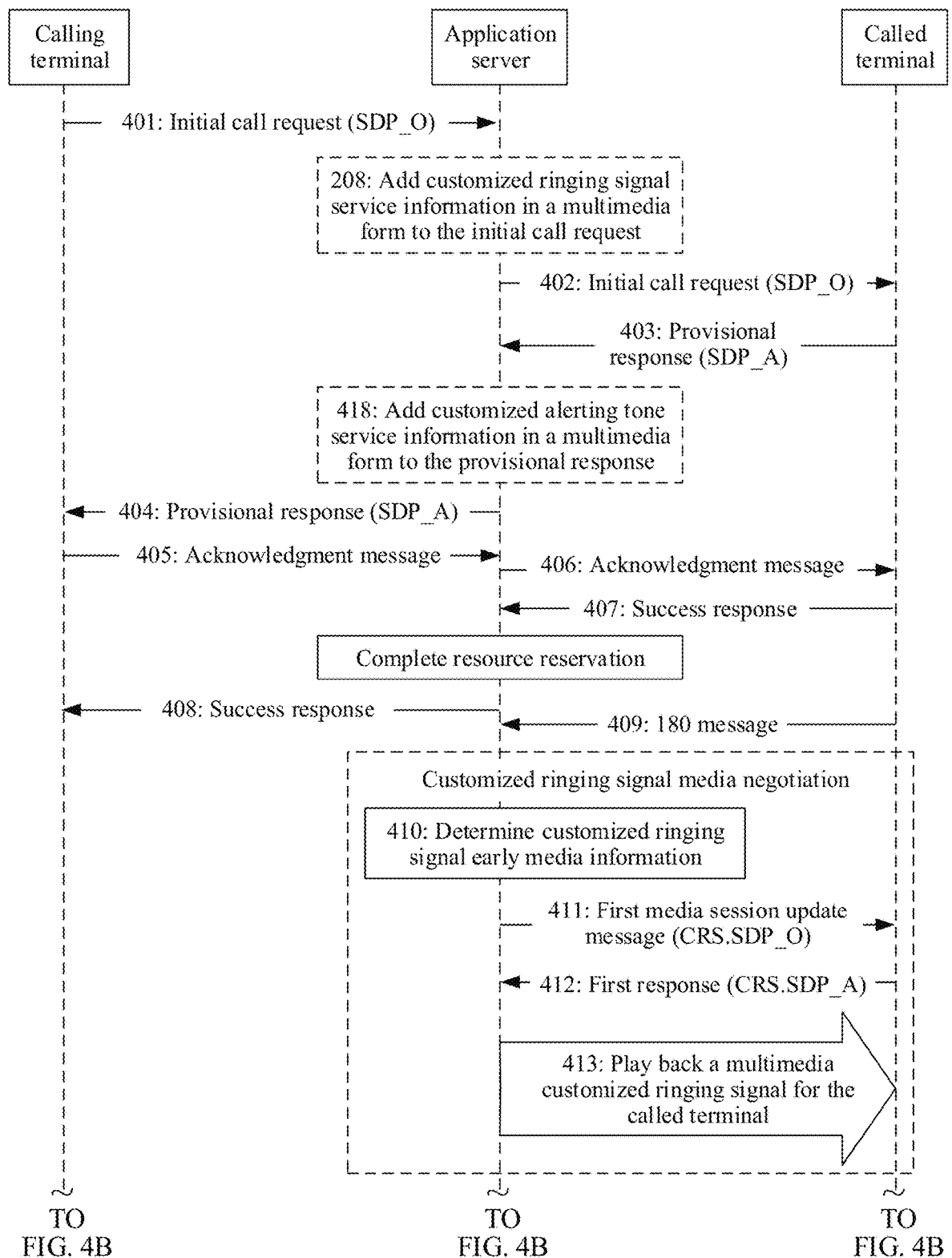
FIG. 4A and FIG. 4B are a schematic flowchart of a method for playing both a multimedia customized alerting tone and a multimedia customized ringing signal according to this application.
Figure 4B:
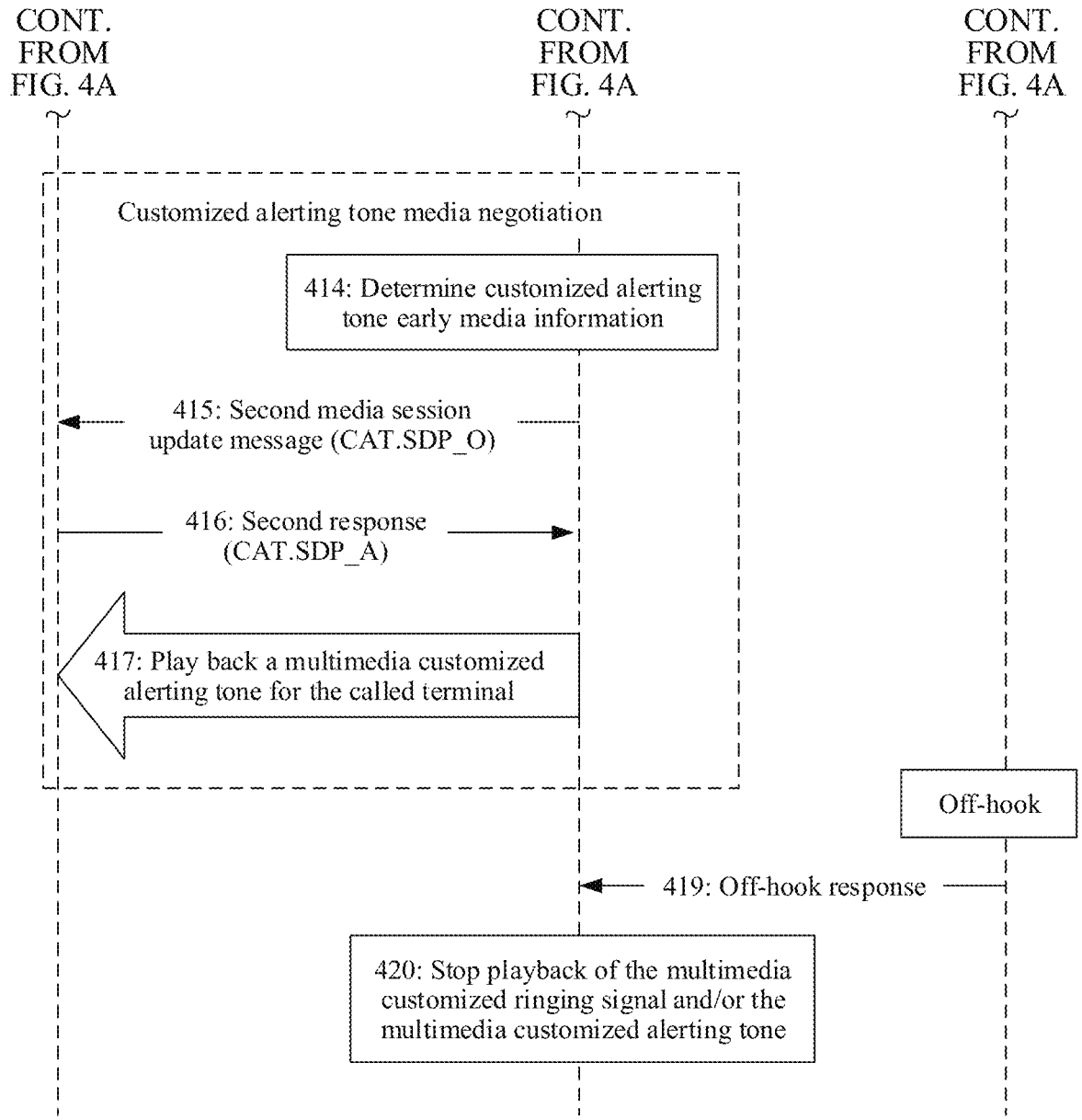

In an example, FIG. 4A and FIG. 4B are a schematic flowchart of a method for playing both a multimedia customized alerting tone and a multimedia customized ringing signal. In this example, an application server may be the application server in FIG. 1, and the application server can play both the multimedia customized ringing signal and the multimedia customized alerting tone; a calling terminal may be the calling terminal in FIG. 1; and a called terminal may be the called terminal in FIG. 1. In this example, descriptions are provided by using an example in which both the called terminal and the calling terminal complete resource reservation. The method includes the following steps.

Step 401: The calling terminal sends an initial call request (INVITE) to the application server.

Step 402: After receiving the initial call request from the calling terminal, the application server sends the initial call request to the called terminal.

Step 403: After receiving the initial call request, the called terminal sends a provisional response to the initial call request to the application server.

Correspondingly, the application server receives the provisional response from the called terminal.

Step 404: The application server sends the provisional response to the calling terminal.

Step 405: After receiving the provisional response, the calling terminal sends an acknowledgment (PRACK) message to the application server.

Step 406: After receiving the acknowledgment (PRACK) message, the application server sends the acknowledgment (PRACK) message to the called terminal, to notify the called terminal that the calling terminal receives the provisional response.

Step 407: After receiving the acknowledgment (PRACK) message, the called terminal sends a success response (200) to the acknowledgment message to the application server.

Correspondingly, the application server receives the success response (200) to the acknowledgment message.

Optionally, the application server may complete resource reservation after receiving the provisional response from the called terminal.

Step 408: The application server sends the success response (200) to the calling terminal.

Step 409: After determining that the calling terminal completes resource reservation and determining that resource reservation is also locally completed, the called terminal may send a 180 message to the application server.

For detailed descriptions of step 401 to step 409, refer to the descriptions of step 301 to step 309 in FIG. 3. Details are not described herein again.

A customized ringing signal media resource negotiation process is described in step 410 to step 413.

Step 410: The application server receives the provisional response, and determines customized ring signal media resource information based on the provisional response.

Step 411: The application server sends a first media session update message to the called terminal.

The first media session update message includes the customized ring signal media resource information.

Step 412: After receiving the first media session update message, the called terminal sends a first response to the first media session update message to the application server.

Step 413: The application server plays back the multimedia customized ringing signal for the called terminal based on the first response.

For detailed descriptions of step 410 to step 413, refer to the descriptions of step 204 to step 207 in FIG. 2. Details are not described herein again.

A customized alerting tone media resource negotiation process is described in step 414 to step 417.

Step 414: The application server determines customized alerting tone early media information based on the initial call request.

In a possible implementation, the customized alerting tone early media information (CAT. SDP_O) may be determined based on whether a Contact header field of the initial call request supports audio, or audio and video.

Step 415: The application server sends a second media session update message (second UPDATE) to the called terminal.

The second media session update message includes the customized alerting tone early media information (CAT.SDP_O). For example, the customized alerting tone early media information may be carried in a PEM header field of the second media session update message. In addition, the second media session update message may carry the PEM header field or the like to indicate the calling terminal.

Step 416: After receiving the second media session update message, the calling terminal sends a second response to the second media session update message to the application server.

Herein, the second response includes a result (CAT.SDP_A) of customized alerting tone media resource negotiation between the application server and the calling terminal.

In a possible implementation, if the calling terminal does not complete resource reservation in a precondition procedure, after the calling terminal sends the second response to the application server, when the calling terminal completes the resource reservation, the calling terminal needs to send UPDATE to the application server, so that the application server determines that the calling terminal completes the resource reservation.

It may be noted that in the precondition procedure, when sending the initial call request to the application server, the calling terminal may also determine that the calling terminal completes the resource reservation. To be specific, the initial call request may also indicate that the calling terminal completes the resource reservation. In this way, the application server can determine that the calling terminal completes the resource reservation.

In another possible implementation, in a non-precondition procedure, only customized alerting tone media resource negotiation between the application server and the calling terminal may be completed without determining whether the calling terminal completes resource reservation.

Step 417: After receiving the second response from the calling terminal, the application server plays back the multimedia customized alerting tone for the calling terminal based on the second response.

In a possible implementation, the application server enables, based on the second response, the calling terminal to play the multimedia customized alerting tone. For example, the application server indicates an MRF server to play the multimedia customized alerting tone for the calling terminal.

It may be noted that the customized alerting tone media resource negotiation process and the customized ringing signal media resource negotiation process may be simultaneously performed. Alternatively, the customized ringing signal media resource negotiation process may be performed before or after the customized alerting tone media resource negotiation process. This is not limited in this application.

Further, after both the customized ringing signal media resource negotiation and the customized alerting tone media resource negotiation are completed, the application server may play both the multimedia customized ringing signal and the multimedia customized alerting tone based on factors such as a system service, a user subscription setting, and an exception. When the application server plays back both the multimedia customized ringing signal and the multimedia customized alerting tone for the called terminal, content played by the customized alerting tone and the customized ringing signal may be the same; or when the application server plays back both the multimedia customized ringing signal and the multimedia customized alerting tone for the called terminal, content played by the customized alerting tone and the customized ringing signal may be different. For example, the application server plays back a video customized ringing signal for the called terminal when playing an audio customized alerting tone, or plays back an audio customized ringing signal for the called terminal when playing a video customized alerting tone.

In a possible implementation, the application server may alternatively play only either of the multimedia customized ringing signal and the multimedia customized alerting tone. For example, one party plays back the multimedia customized ringing signal for the called terminal, but the other party does not play the multimedia customized ringing signal. For another example, one party plays the multimedia customized alerting tone, but the other party does not play the multimedia customized alerting tone. In another possible implementation, the application server may alternatively play neither the customized alerting tone nor the customized ringing signal.

In a possible implementation, the customized alerting tone media resource negotiation between the application server and the calling terminal may also be implemented based on any one of an early session mode, a forking mode, and a download and play mode in a signaling procedure. This is not specifically limited in this application.

Based on the solution shown in FIG. 4A and FIG. 4B, the application server can implement a function of playing both the multimedia customized alerting tone and the multimedia customized ringing signal, to improve user's perception of a customized alerting tone service, enhance stickiness of the customized alerting tone service and a customized ringing signal service, and help develop the customized ringing signal service and the customized alerting tone service.

Before step 404, after receiving the provisional response from the called terminal, the application server may add service information of a customized alerting tone in a multimedia form to the provisional response (step 418 in FIG. 4A and FIG. 4B). In a possible implementation, the application server may add the service information of the customized alerting tone in the multimedia form to a Call-Info header field of the provisional response. In another possible implementation, the application server may add service information of a customized ringing signal in a multimedia form to an Alert-Info header field of the provisional response, and add the service information of the customized ringing signal in the multimedia form to a Call-Info header field of the provisional response. The application server sends, to the calling terminal, a provisional response to which the service information of the customized alerting tone in the multimedia form is added. The calling terminal may obtain customized alerting tone service content in the multimedia form based on the service information of the customized alerting tone in the multimedia form. The customized alerting tone service content in the multimedia form includes but is not limited to functions of improving a customized alerting tone service such as an external subtitle, a contact card, and a control.

It may be noted that after receiving the provisional response to which the service information of the customized alerting tone in the multimedia form is added, the calling terminal may immediately obtain (for example, download) the customized alerting tone service content in the multimedia form; or may download customized alerting tone service content in the multimedia form at another time before the customized alerting tone service content in the multimedia form is played. This is not limited in this application.

The application server adds the service information of the customized alerting tone in the multimedia form to the provisional response, so that after receiving the provisional response, the calling terminal can obtain the customized alerting tone service content in the multimedia form based on the service information that is of the customized alerting tone in the multimedia form and that is added to the provisional response. The customized alerting tone service content in the multimedia form can be used in application scenarios such as user operation reminding, service notification, advertising propaganda, a holiday special effect, and personalized information push. This can further enrich service content of a customized alerting tone service and improve interactive operation experience. For example, when the service information of the customized alerting tone in the multimedia form is a web page, the web page may be directly operated (for example, tapped for browsing). When the service information of the customized alerting tone in the multimedia form is a control, the control may be directly operated.

In a possible implementation, when the called terminal rings, the application server plays back the multimedia customized alerting tone for the calling terminal, and the calling terminal may play the downloaded customized alerting tone service content in the multimedia form such as an external subtitle, a contact card, and a control on time (for example, synchronously).

In a possible implementation, when the application server plays back both the multimedia customized ringing signal and the multimedia customized alerting tone for the called terminal, the customized alerting tone media resource negotiation between the application server and the calling terminal may also be implemented based on any one of an early session mode, a forking mode, a download and play mode, and the like in a signaling procedure, and the customized ringing signal media resource negotiation between the application server and the called terminal may also be implemented based on any one of the early session mode, the download and play mode, and the like in the signaling procedure.

In a possible implementation, the customized ringing signal media resource negotiation between the application server and the called terminal may also be implemented based on any one of an early session mode, a download and play mode, and the like in a signaling procedure. In addition, the application server may add the service information of the customized ringing signal in the multimedia form to the initial call request, and sends, to the called terminal, an initial call request to which the service information of the customized ringing signal in the multimedia form is added; and the called terminal obtains the customized ringing signal service content in the multimedia form based on the service information that is of the customized ringing signal in the multimedia form and that is in the initial call request.

In a possible implementation, the customized alerting tone media resource negotiation between the application server and the calling terminal may also be implemented based on any one of an early session mode, a download and play mode, and the like in a signaling procedure. In addition, after receiving the provisional response from the called terminal, the application server may add the service information of the customized alerting tone in the multimedia form to the provisional response, and the application server sends, to the calling terminal, the provisional response to which the service information of the customized alerting tone in the multimedia form is added. The calling terminal may obtain the customized alerting tone service content in the multimedia form based on the service information of the customized alerting tone in the multimedia form.

This application provides the following three implementations of stopping playback of the multimedia customized ringing signal and/or the multimedia customized alerting tone.

Implementation 1: The Called Terminal Hooks Off

After the called terminal hooks off, the called terminal sends an off-hook response to the application server (step 419 in FIG. 4A and FIG. 4B). Correspondingly, after receiving the off-hook response from the called terminal, the application server stops playback of the multimedia customized ringing signal and/or the multimedia customized alerting tone (step 420 in FIG. 4A and FIG. 4B).

In Implementation 1, if the initial call request is a video call, the called terminal may select video answer or audio answer. When the called terminal selects the audio answer, in a possible implementation, when the called terminal replies a success response (200) to the initial call request to the application server, SDP information carried in the success response (200) includes disabling a video media port. In another possible implementation, before sending a success response (200) to the initial call request to the application server, the called terminal may initiate a media information change operation to the application server, to change call media into audio media through negotiation. A manner of the change operation is the same as a process in the conventional technology. Details are not described herein.

In a possible implementation, the application server may stop playback of the multimedia customized ringing signal and/or the multimedia customized alerting tone at any time between a time after the application server receives the off-hook response from the called terminal and a time before the application server determines a message indicating that call media resource negotiation between the calling terminal and the called terminal is completed. In a specific implementation, based on different signaling solutions, the application server may continue playing the multimedia customized ringing signal and/or the multimedia customized alerting tone for a period of time after the called terminal hooks off. Further, regarding stopping playback of the multimedia customized ringing signal for the called terminal, based on a situation, the application server may choose not to stop playback of the customized ringing signal service content in the multimedia form, but to continue, during a call, playing the customized ringing signal service content in the multimedia form. Similarly, regarding stopping playback of the multimedia customized alerting tone for the calling terminal, based on a situation, the application server may choose not to stop playback of the customized alerting tone service content in the multimedia form, but to continue, during a call, playing the customized alerting tone service content in the multimedia form.

Implementation 2: The Called Terminal Hangs Up a Call

In Implementation 2, after receiving an on-hook message (also referred to as a Cancel message) from the called terminal, the application server may stop playback of the multimedia customized ringing signal and/or the multimedia customized alerting tone, and transparently transmit the on-hook message to the calling terminal.

Implementation 3: The Calling Terminal Hangs Up a Call

In Implementation 3, after receiving an on-hook message from the calling terminal, the application server may stop playback of the multimedia customized ringing signal and/or the multimedia customized alerting tone, and transparently transmit the on-hook message and a subsequent message to the called terminal, to release the call between the calling terminal and the called terminal.

Based on Implementation 2 and Implementation 3, after or even during customized alerting tone media resource negotiation and/or customized ringing signal media resource negotiation, when either of the calling terminal and the called terminal hangs up the call, after receiving the on-hook message, the application server may stop playback of the multimedia customized alerting tone and/or the multimedia customized ringing signal, and transparently transmit the on-hook message and the subsequent message to another party, to release the call between the calling terminal and the called terminal.

After the application server receives the off-hook response from the called terminal, call media renegotiation needs to be performed between the calling terminal and the called terminal to facilitate the call between the calling terminal and the called terminal. In a possible implementation, the application server triggers call media renegotiation between the calling terminal and the called terminal. This application provides the following three methods for performing call media renegotiation between the calling terminal and the called terminal.

Method 1

Figure 5:
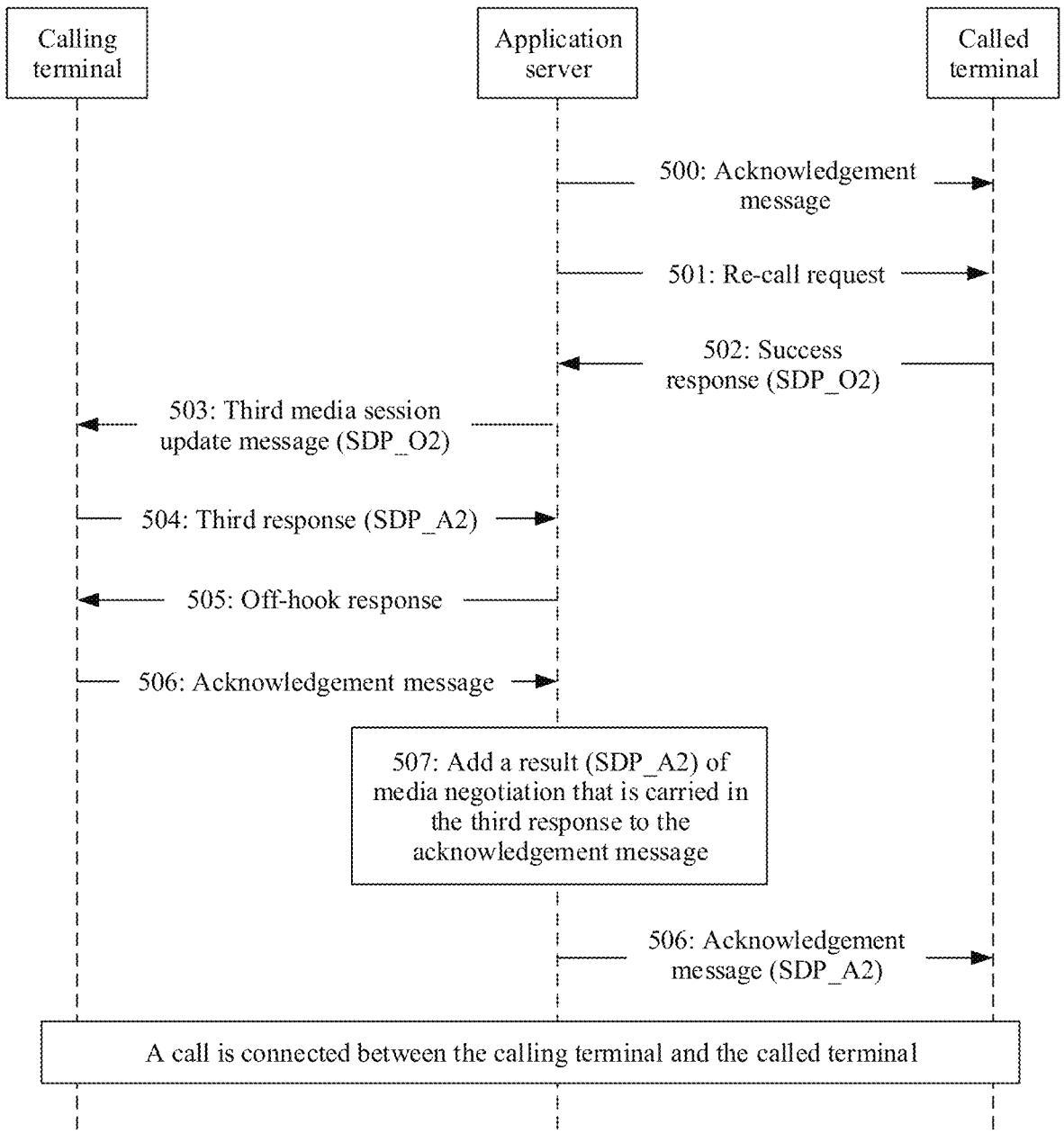
FIG. 5 is a schematic flowchart of a method for performing call media renegotiation between a calling terminal and a called terminal according to this application.

FIG. 5 is a schematic flowchart of a method for performing call media renegotiation between a calling terminal and a called terminal according to this application. In this example, an application server may be the application server in FIG. 1, and the application server can play both a multimedia customized ringing signal and a multimedia customized alerting tone; the calling terminal may be the calling terminal in FIG. 1; and the called terminal may be the called terminal in FIG. 1. The method includes the following steps.

Step 500: After receiving an off-hook response from the called terminal, the application server sends an acknowledgement ACK message to the called terminal, to notify the called terminal that the off-hook response is received.

In a possible implementation, the application server may stop playback of the multimedia customized ringing signal and/or the multimedia customized alerting tone before step 500.

Step 501: The application server sends a re-call request (re-INVITE) to the called terminal.

The re-call request is used to perform the call media resource renegotiation between the called terminal and the calling terminal, and SDP information carried in the re-call request is null.

Step 502: The called terminal sends a success response (200) to the re-call request to the application server.

Herein, the called terminal may determine, in an off-hook manner, call media information (SDP_O2) that is of the called terminal and that is carried in the success response (200) to the re-call request. For example, if the off-hook manner of the called terminal is audio, the success response (200) carries all-media information of the audio of the called terminal. For example, if the off-hook manner of the called terminal is video, the success response (200) carries all-media information of the video of the called terminal.

Step 503: The application server sends a third media session update message (third UPDATE) to the calling terminal.

That the third media session update message (third UPDATE) includes the call media information (SDP_O2) of the called terminal may mean that the third media session update message includes the call media information supported by the called terminal, to perform call media change negotiation between the calling terminal and the called terminal.

Step 504: The calling terminal sends a third response to the third media session update message to the application server.

Herein, the third response may carry a result (SDP_A2) of media resource negotiation with the calling terminal.

Step 505: The application server forwards the off-hook response of the called terminal to the calling terminal.

The off-hook response in step 505 is a response to an initial call request.

Step 506: The calling terminal sends an acknowledgement ACK message to the application server.

In a possible implementation, the application server may alternatively stop playback of the multimedia customized ringing signal and/or the multimedia customized alerting tone before step 506.

Step 507: After receiving the acknowledgement ACK message sent by the calling terminal, the application server adds the result (SDP_A2) of the media resource negotiation that is carried in the third response to the acknowledgement ACK message.

Step 508: The application server sends, to the called terminal, the acknowledgement ACK message to which the result (SDP_A2) of the media resource negotiation is added.

In step 501 to step 508, the call media renegotiation between the calling terminal and the called terminal is completed, so that a call can be normally connected between the calling terminal and the called terminal.

Method 2

Figure 6:
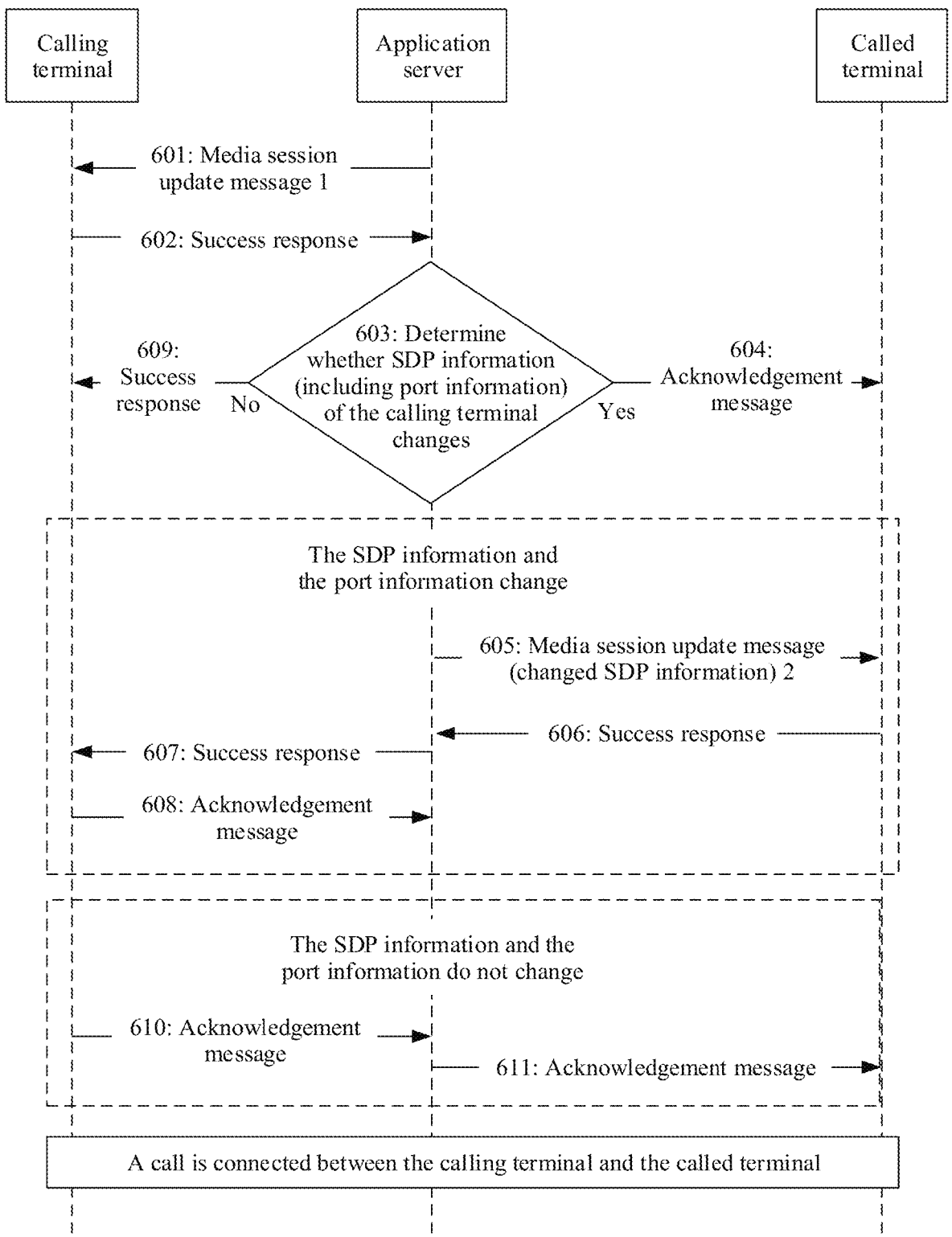
FIG. 6 is a schematic flowchart of another method for performing call media renegotiation between a calling terminal and a called terminal according to this application.

FIG. 6 is a schematic flowchart of another method for performing call media renegotiation between a calling terminal and a called terminal according to this application. In this embodiment, an application server may be the application server in FIG. 1, and the application server can play both a multimedia customized ringing signal and a multimedia customized alerting tone; the calling terminal may be the calling terminal in FIG. 1; and the called terminal may be the called terminal in FIG. 1. The method includes the following steps.

Step 601: The application server sends a media session update message 1 (UPDATE 1) to the calling terminal.

The media session update message 1 carries a result of media resource negotiation with the called terminal.

In a possible implementation, the application server may alternatively stop playback of the multimedia customized ringing signal and/or the multimedia customized alerting tone before step 601.

Step 602: The calling terminal sends a success response to the media session update message 1 (UPDATE 1) to the application server.

Optionally, the response carries SDP information and port information of the calling terminal.

Step 603: The application server determines whether the SDP information and the port information of the calling terminal change. If the SDP information and the port information of the calling terminal change, step 604 to step 607 are performed. If the SDP information and the port information of the calling terminal does not change, step 608 to step 610 are performed.

If the SDP information and the port information of the calling terminal change, it indicates that the call media renegotiation between the calling terminal and the called terminal is not completed in a process of sending an initial call request by the calling terminal. If the SDP information and the port information of the calling terminal do not change, it indicates that call media resource negotiation between the calling terminal and the called terminal is completed in a process of sending an initial call request by the calling terminal.

Step 604: The application server sends an acknowledgement ACK message to the called terminal.

Step 605: The application server sends a media session update message 2 (UPDATE 2) to the called terminal.

The media session update message 2 carries the changed SDP information of the calling terminal.

Step 606: The called terminal sends a success response to the media session update message 2 (UPDATE 2) to the application server.

In step 601 to step 606, the call media renegotiation can be completed.

Step 607: The application server sends a success response (200) to an initial call request to the calling terminal.

Step 608: The calling terminal sends an acknowledgement ACK message to the application server.

In step 607 and step 608, a call signaling process between the calling terminal and the called terminal can be established.

Step 609: The application server sends a success response (200) to an initial call request to the calling terminal.

Step 610: The calling terminal sends an acknowledgement ACK message to the application server.

Step 611: The application server forwards the ACK of the calling terminal to the called terminal, to establish a call signaling process between the calling terminal and the called terminal.

In step 601 to step 611, the call media renegotiation between the calling terminal and the called terminal is also completed, so that a call can be normally connected between the calling terminal and the called terminal.

Method 3

Figure 7:
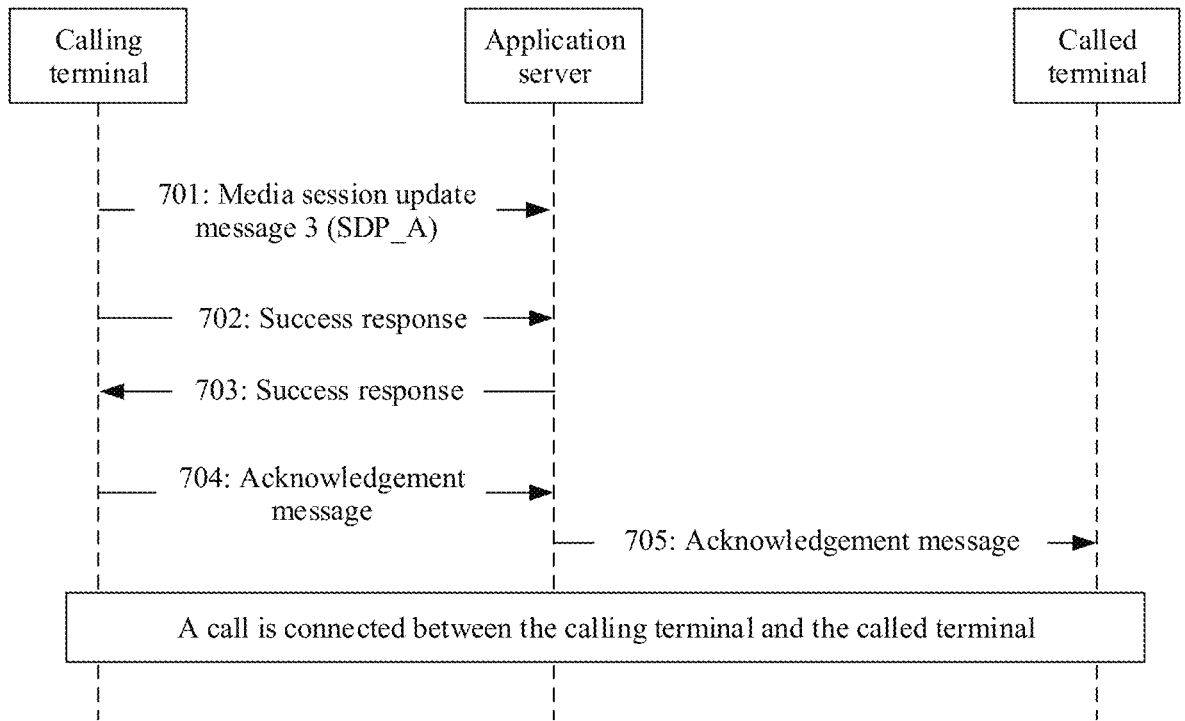
FIG. 7 is a schematic flowchart of another method for performing call media renegotiation between a calling terminal and a called terminal according to this application.

FIG. 7 is a schematic flowchart of another method for performing call media renegotiation between a calling terminal and a called terminal according to this application. In this embodiment, an application server may be the application server in FIG. 1, and the application server can play both a multimedia customized ringing signal and a multimedia customized alerting tone; the calling terminal may be the calling terminal in FIG. 1; and the called terminal may be the called terminal in FIG. 1. The method includes the following steps.

Step 701: The application server sends a media session update message 3 (UPDATE 3) to the calling terminal.

The media session update message 3 carries a result (SDP_A) of media resource negotiation with the called terminal, and the result of the media resource negotiation is obtained from an off-hook response.

Step 702: The calling terminal sends a success response to the media session update message 3 (UPDATE 3) to the application server.

Step 703: The application server sends a success response (200) to an initial call request to the calling terminal.

Step 704: The application server receives an acknowledgement ACK message from the calling terminal.

Step 705: The application server forwards the acknowledgement ACK message of the calling terminal to the called terminal, to establish a call signaling process between the calling terminal and the called terminal.

In step 701 to step 705, a call can be normally connected between the calling terminal and the called terminal.

Figure 8:
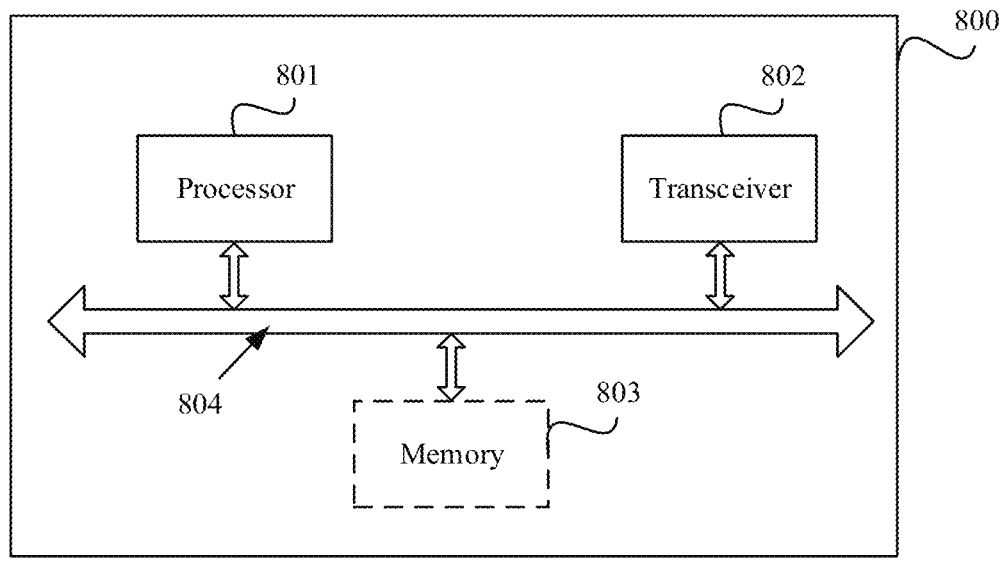
FIG. 8 is a schematic structural diagram of an application server according to this application.

Based on the foregoing content and a same concept, an embodiment of this application provides an application server, configured to perform any solution of the application server in the foregoing methods. FIG. 8 shows an example of a schematic structural diagram of an application server according to an embodiment of this application. As shown in FIG. 8, the application server includes a processor 801, a transceiver 802, and a bus 804. The application server may be any application server in FIG. 1, or may be any one of the application servers in FIG. 2 to FIG. 6.

The processor 801 may be a central processing unit (central processing unit, CPU), a network processor (network processor, NP), or a combination of a CPU and an NP. The processor 801 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

In an optional implementation, the application server may further include a memory 803. The memory 803 may include a volatile memory (volatile memory), for example, a random access memory (random access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories. Program instructions may be stored in the memory, or program instructions may be stored in the processor (for example, when the processor is the NP). The processor 801 invokes the stored program instructions, and may perform one or more steps or an optional implementation in the embodiment shown in the foregoing solution.

The bus 804 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 8, but this does not mean that there is only one bus or only one type of bus.

In a possible implementation, the processor 801 and the memory 803 may be integrated together, or the processor 801 and the memory 803 may be coupled through an interface. Alternatively, the processor 801 is a hardware chip, and the memory 803 is outside the chip. This is not limited in this application.

It may be noted that the memory 803 may further store multimedia playback setting data, multimedia customized ringing signal content, and multimedia customized alerting tone content.

It may be noted that FIG. 8 shows only a simplified design of the application server. In actual application, the application server may include any quantity of processors, memories, transceivers, and the like, and all application servers that can implement this application fall within the protection scope of this application.

Specifically, the transceiver 802 is configured to: receive an initial call request from a calling terminal, and send the initial call request to a called terminal; and receive a provisional response to the initial call request from the called terminal, where the initial call request includes session description protocol SDP information of the calling terminal. The processor 801 is configured to determine customized ring signal media resource information based on the provisional response. The transceiver 802 is further configured to: send a first media session update message to the called terminal; and receive a first response from the called terminal, where the first media session update message includes the customized ring signal media resource information, and the first response includes a result of customized ringing signal media resource negotiation between the application server and the called terminal. The processor 801 is further configured to play a multimedia customized ringing signal based on the first response.

In an optional implementation, the processor 801 is further configured to: determine that resource reservation is locally completed, and determine that the called terminal completes resource reservation.

In an optional implementation, the processor 801 is further configured to determine customized alerting tone early media information based on the initial call request. The transceiver 802 is further configured to: send a second media session update message to the calling terminal, and receive a second response from the calling terminal, where the second media session update message includes the customized alerting tone early media information, and the second response includes a result of customized alerting tone media resource negotiation between the application server and the calling terminal. The processor 801 is further configured to play a multimedia customized alerting tone based on the second response.

In an optional implementation, the processor 801 is further configured to add service information of a customized alerting tone in a multimedia form to a Call-Info header field of the provisional response. The transceiver 802 is further configured to send, to the calling terminal, a provisional response to which the service information of the customized alerting tone in the multimedia form is added.

In an optional implementation, the processor 801 is specifically configured to: add the service information of the customized alerting tone in the multimedia form to an Alert-Info header field of the provisional response; and/or add the service information of the customized alerting tone in the multimedia form to the Call-Info header field of the provisional response.

In an optional implementation, the processor 801 is further configured to add service information of the customized ringing signal in the multimedia form to the initial call request. The transceiver 802 is further configured to send, to the called terminal, an initial call request to which the service information of the customized ringing signal in the multimedia form is added.

In an optional implementation, the processor 801 is specifically configured to: add the service information of the customized ringing signal in the multimedia form to an Alert-Info header field of the initial call request, and/or add the service information of the customized ringing signal in the multimedia form to a Call-Info header field of the initial call request.

In an optional implementation, the processor 801 is further configured to add indication information indicating that a network side plays back a multimedia customized ringing signal for the called terminal to the Alert-Info header field of the initial call request. The transceiver 802 is further configured to send, to the called terminal, the initial call request to which the indication information is added.

In an optional implementation, the processor 801 is further configured to: after controlling the transceiver to receive an off-hook response from the called terminal, stop playback of the multimedia customized ringing signal and/or the multimedia customized alerting tone; or after controlling the transceiver to receive an on-hook message from the calling terminal, stop playback of the multimedia customized ringing signal and/or the multimedia customized alerting tone; or after controlling the transceiver to receive an on-hook message from the called terminal, stop playback of the multimedia customized ringing signal and/or the multimedia customized alerting tone.

In an optional implementation, the processor 801 is further configured to trigger call media renegotiation between the calling terminal and the called terminal.

Figure 9:
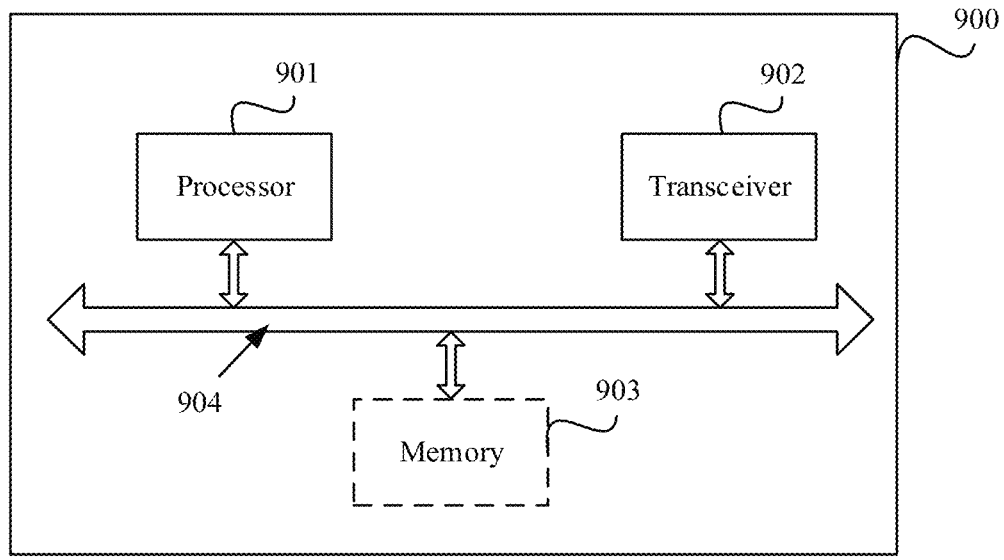
FIG. 9 is a schematic structural diagram of a communications apparatus according to this application.

Based on the foregoing content and a same concept, an embodiment of this application provides a communications apparatus, configured to perform any solution of the calling terminal in the foregoing methods, or configured to perform any solution of the called terminal in the foregoing methods. FIG. 9 shows an example of a schematic structural diagram of a communications apparatus according to an embodiment of this application. As shown in FIG. 9, the communications apparatus includes a processor 901, a transceiver 902, and a bus 904. The communications apparatus may be the called terminal or the calling terminal in FIG. 1, or may be any one of the called terminals or any one of the calling terminals in FIG. 2 to FIG. 6.

The processor 901 may be a central processing unit (central processing unit, CPU), a network processor (network processor, NP), or a combination of a CPU and an NP. The processor 901 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

In an optional implementation, the communications apparatus may further include a memory 903. The memory 903 may include a volatile memory (volatile memory), for example, a random access memory (random-access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories. Program instructions may be stored in the memory, or program instructions may be stored in the processor (for example, when the processor is the NP). The processor 901 invokes the stored program instructions, and may perform one or more steps or an optional implementation in the embodiment shown in the foregoing solution.

The bus 904 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 9, but this does not mean that there is only one bus or only one type of bus.

In a specific implementation, in an embodiment, the communications apparatus may further include an input/output (I/O) interface. The input/output (I/O) interface is configured to connect to a device that plays multimedia content. For example, the device that plays multimedia content may be a liquid crystal display (liquid crystal display, LCD) display device, a light emitting diode (light emitting diode, LED) display device, a cathode ray tube (cathode ray tube, CRT) display device, or a projector (projector). In another embodiment, the communications apparatus may include a device that plays multimedia content, for example, an LCD display device, an LED display device, or a CRT display device.

In a possible implementation, the processor 901 and the memory 903 may be integrated together, or the processor 901 and the memory 903 may be coupled through an interface. Alternatively, the processor 901 is a hardware chip, and the memory 903 is outside the chip. This is not limited in this application.

It may be noted that FIG. 9 shows only a simplified design of the communications apparatus. In actual application, the communications apparatus may include any quantity of processors, memories, transceivers, and the like, and all communications apparatuses that can implement this application fall within the protection scope of this application.

When the communications apparatus in this example is the called terminal, the transceiver 902 is configured to: receive an initial call request from a calling terminal, send a provisional response to the initial call request to an application server, and receive a first media session update message from the application server; and send a first response to the first media session update message to the application server, where the initial call request includes session description protocol SDP information of the calling terminal, the first media session update message includes customized ring signal media resource information, the customized ring signal media resource information is determined by the application server based on the provisional response, and the first response includes a result of customized ringing signal media resource negotiation between the application server and the called terminal. The processor 901 is configured to determine the first response based on the first media session update message.

In an optional implementation, the processor 901 is further configured to determine that resource reservation is locally completed. The transceiver 902 is further configured to send a media session update message to the application server, where the media session update message is used to indicate that the called terminal completes resource reservation.

In an optional implementation, the transceiver 902 is further configured to receive, from the application server, an initial call request to which service information of a customized ringing signal in a multimedia form is added. The processor 901 is further configured to: obtain customized ringing signal service content in the multimedia form based on service information that is of the customized ringing signal in a multimedia form and that is in the initial call request, and play the customized ringing signal service content in the multimedia form when determining that the application server plays back the multimedia customized ringing signal for the called terminal.

In an optional implementation, the processor 901 is specifically configured to: obtain the customized ringing signal service content in the multimedia form based on the service information that is of the customized ringing signal in the multimedia form and that is in an Alert-Info header field of the initial call request; and/or obtain the customized ringing signal service content in the multimedia form based on the service information that is of the customized ringing signal in the multimedia form and that is in a Call-Info header field of the initial call request.

In an optional implementation, the transceiver 902 is further configured to perform call media renegotiation with the calling terminal.

In an optional implementation, the transceiver 902 is further configured to receive an initial call request from the application server, where an Alert-Info header field of the initial call request carries indication information indicating that a network side plays back a multimedia customized ringing signal for the called terminal. The processor 901 does not play a local ringing tone based on the indication information after a 180 message is sent. Alternatively, after a 180 message is sent, the processor 901 plays a local ringing tone based on the indication information if a customized ringing signal multimedia stream and/or the first media session update message that carries the customized ring signal media resource information that are/is sent by a network side are/is still not received within a preset time.

When the communications apparatus in this example is the calling terminal, the transceiver 902 is configured to: receive a second media session update message from an application server, and send a second response to the second media session update message to the application server, where the second media session update message includes customized alerting tone early media information, and the second response includes a result of customized alerting tone media resource negotiation between the application server and the calling terminal.

In an optional implementation, the transceiver 902 is further configured to receive, from the application server, a provisional response to which service information of a customized alerting tone in a multimedia form is added. The processor 901 is specifically configured to: obtain customized alerting tone service content in the multimedia form based on the service information that is of the customized alerting tone in the multimedia form and that is in the provisional response, and play the customized alerting tone service content in the multimedia form when determining that the application server plays back a multimedia customized alerting tone for the called terminal.

Figure 10:
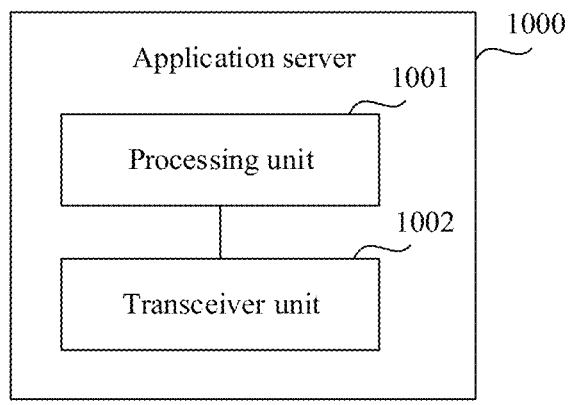
FIG. 10 is a schematic structural diagram of an application server according to this application.

Based on the foregoing content and a same concept, this application provides an application server, configured to perform any solution on an application server side in the foregoing method procedures. FIG. 10 shows an example of a schematic structural diagram of an application server 1000 according to this application. As shown in FIG. 10, the application server 1000 includes a processing unit 1001 and a transceiver unit 1002, and may perform a solution correspondingly performed by any one of the application servers in FIG. 2 to FIG. 6. The application server 1000 may be the application server in FIG. 1.

The transceiver unit 1002 is configured to: receive an initial call request from a calling terminal, and send the initial call request to a called terminal; and receive a provisional response to the initial call request from the called terminal, where the initial call request includes session description protocol SDP information of the calling terminal. The processing unit 1001 is configured to determine customized ring signal media resource information based on the provisional response. The transceiver unit 1002 is further configured to: send a first media session update message to the called terminal; and receive a first response from the called terminal, where the first media session update message includes the customized ring signal media resource information, and the first response includes a result of customized ringing signal media resource negotiation between the application server and the called terminal. The processing unit 1001 is further configured to play a multimedia customized ringing signal based on the first response.

For related content of the foregoing optional implementations in this embodiment of this application, refer to the foregoing embodiments. Details are not described herein again.

It may be understood that division into the units of the application server is merely logical function division. In an actual implementation, all or some of the units may be integrated into a physical entity, or may be physically separated. In this application, the transceiver unit 1002 may be implemented by the transceiver 802 in FIG. 8, and the processing unit 1001 may be implemented by the processor 801 in FIG. 8. To be specific, the transceiver unit 1002 in this application may perform the solution performed by the transceiver 802 in FIG. 8. The processing unit 1001 in this application may perform the solution performed by the processor 801 in FIG. 8. For other content, refer to the foregoing content. Details are not described herein again. As shown in FIG. 8, the memory 803 included in the application server 800 may be configured to store code used when the processor 801 included in the application server 800 performs the solution. The code may be a program/code preinstalled when the application server 800 is delivered from a factory.

Figure 11:
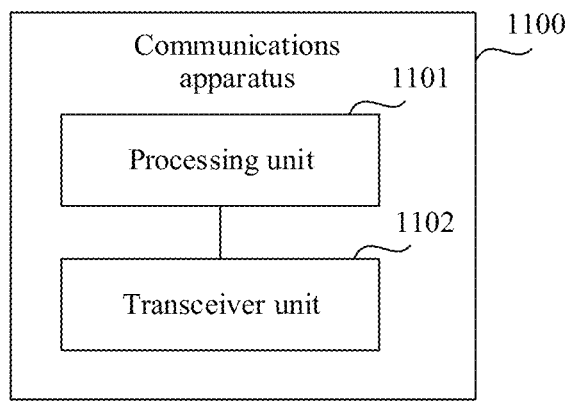
FIG. 11 is a schematic structural diagram of a communications apparatus according to this application.

Based on the foregoing content and a same concept, this application provides a communications apparatus, configured to perform any solution on a called terminal side in the foregoing method procedures. FIG. 11 shows an example of a schematic structural diagram of a communications apparatus 1100 according to an embodiment of this application. As shown in FIG. 11, the communications apparatus 1100 includes a processing unit 1101 and a transceiver unit 1102. The communications apparatus 1100 in this example may perform a solution correspondingly performed by any one of the communications apparatus in FIG. 2 to FIG. 6. The communications apparatus 1100 may be the called terminal in FIG. 1.

Specifically, the transceiver unit 1102 is configured to: receive an initial call request from a calling terminal, send a provisional response to the initial call request to an application server, and receive a first media session update message from the application server; and send a first response to the first media session update message to the application server, where the initial call request includes session description protocol SDP information of the calling terminal, the first media session update message includes customized ring signal media resource information, the customized ring signal media resource information is determined by the application server based on the provisional response, and the first response includes a result of customized ringing signal media resource negotiation between the application server and the called terminal. The processing unit 1101 is configured to determine the first response based on the first media session update message.

For related content of the foregoing optional implementations in this embodiment of this application, refer to the foregoing embodiments. Details are not described herein again.

Based on the foregoing content and a same concept, this application provides a communications system. The communications system may include the foregoing one or more application servers and the foregoing one or more communications apparatuses. The communications apparatus may perform any method on a terminal side, and the application server may perform any method on an application server side. For possible implementations of the application server and the communications apparatus, refer to the foregoing descriptions. Details are not described herein again.

It may be understood that division into the units of the communications apparatus is merely logical function division. In an actual implementation, all or some of the units may be integrated into a physical entity, or may be physically separated. In this embodiment of this application, the transceiver unit 1102 may be implemented by the transceiver 902 in FIG. 9, and the processing unit 1101 may be implemented by the processor 901 in FIG. 9. To be specific, the transceiver unit 1102 in this embodiment of this application may perform the solution performed by the transceiver 902 in FIG. 9. The processing unit 1101 in this embodiment of this application may perform the solution performed by the processor 901 in FIG. 9. For other content, refer to the foregoing content. Details are not described herein again. As shown in FIG. 9, the memory 903 included in the communications apparatus 900 may be configured to store code used when the processor 901 included in the communications apparatus 900 performs the solution. The code may be a program/code pre-installed when the communications apparatus 900 is delivered from a factory.

All or some of the foregoing embodiments may be implemented by using software, hardware, firmware, or any combination thereof. When a software program is used to implement the embodiments, all or some of the embodiments may be implemented in a form of a computer program product. The computer program product includes one or more instructions. When the computer program instructions are loaded and executed on a computer, the procedures or functions according to the embodiments of this application are completely or partially generated. The computer may be a general-purpose computer, a dedicated computer, a computer network, or another programmable apparatus. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to the computer, or a data storage device, such as a server or a data center, integrating one or more usable media. The usable medium may be a magnetic medium (for example, a floppy disk, a hard disk, a magnetic tape, or a magnetic optical disk (MO)), an optical medium (for example, a CD, a DVD, a BD, or an HVD), a semiconductor medium (for example, a ROM, an EPROM, an EEPROM, a non-volatile memory (NAND FLASH), or a solid-state drive (Solid State Disk, SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer usable storage media (including but not limited to a disk memory, a CD-ROM, an optical memory, and the like) that include computer usable program code.

The embodiments of this application are described with reference to the flowcharts and/or block diagrams of the method, the device (system), and the computer program product according to the embodiments of this application. It may be understood that instructions may be used to implement each procedure and/or each block in the flowcharts and/or the block diagrams and a combination of a procedure and/or a block in the flowcharts and/or the block diagrams. These instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These instructions may also be stored in a computer readable memory that can indicate the computer or the another programmable data processing device to work in a specific manner, so that the instructions stored in the computer readable memory generate an artifact that includes an instruction apparatus. The instruction apparatus implements a specified function in one or more procedures in the flowcharts and/or in one or more blocks in the block diagrams.

These instructions may be loaded into the computer or the another programmable data processing device, so that a series of operations and steps are performed on the computer or the another programmable device, to generate computer-implemented processing. Therefore, the instructions executed on the computer or the another programmable device provide steps for implementing a specified function in one or more procedures in the flowcharts and/or in one or more blocks in the block diagrams.

It is clear that a person skilled in the art can make various modifications and variations to the embodiments of this application without departing from the scope of this application. This application is intended to cover these modifications and variations of the embodiments of this application provided that they fall within the scope of protection defined by the following claims and their equivalent technologies.

What is claimed is:

1. A communication method performed by a terminating terminal or a component in the terminating terminal, comprising:
   receiving, by the terminating terminal or the component in the terminating terminal, an initial invite request from an originating terminal, wherein the initial invite request is used to initiate a session, and wherein the initial invite request comprises session description protocol (SDP) information of the originating terminal;
   sending, by the terminating terminal or the component in the terminating terminal, a provisional response to an application server in response to the initial invite request;
   receiving, by the terminating terminal or the component in the terminating terminal, an update message from the application server, wherein the update message comprises SDP information of customized ring signal media and is to modify the session; and
   after receiving the update message, playing the customized ring signal media in the modified session.

2. The method according to claim 1, further comprises:
   performing call media resource renegotiation with the originating terminal.

3. The method according to claim 1, wherein the update message is a session initiation protocol (SIP) UPDATE message.

4. The method according to claim 1, wherein the provisional response is a 180 message or a 183 message.

5. The method according to claim 1, further comprising:
sending a response to the application server in response to the update message, wherein the response comprises an answer for the SDP information of the customized ring signal media.

6. A communication method, comprising:
receiving a first initial invite request from an originating terminal;
sending a second initial invite request to a terminating terminal based on the first initial invite request, wherein the first initial invite request and the second initial invite request are used to initiate a session;
receiving a provisional response from the terminating terminal in response to the second initial invite request; and
sending, from an application server, an update message to the terminating terminal, wherein the update message comprises SDP information of customized ring signal media and is to modify the session, and wherein the customized ring signal media is to be played in the modified session.

7. The method according to claim 6, further comprising:
determining the SDP information of the customized ring signal media based on the provisional response.

8. The method according to claim 6, further comprising:
enabling, based on the response, the terminating terminal to play the customized ring signal media.

9. The method according to claim 6, further comprising:
receiving a response from the terminating terminal in response to the update message, wherein the response comprises an answer for the SDP information of the customized ring signal media.

10. The method according to claim 6, wherein the update message is a session initiation protocol (SIP) UPDATE message.

11. The method according to claim 6, wherein the first initial invite request is received by a call session control function, and the method further comprises:
sending, by the call session control function and based on the first initial invite request, a third initial invite request to the application server, wherein the third initial invite request is used to initiate the session; and
wherein sending the second initial invite request to the second terminal comprises sending, by the application server and based on the third initial invite request, the second initial invite request to the terminating terminal.

12. A communication apparatus, comprising:
at least one processor; and
one or more memories coupled to the at least one processor and storing programming instructions for execution by the at least one processor to cause the communication apparatus to:
receive a first initial invite request from an originating terminal;
send a second initial invite request to a terminating terminal based on the first initial invite request, wherein the first initial invite request and the second initial invite request are used to initiate a session;
receive a provisional response from the terminating terminal in response to the second initial invite request; and
send an update message to the terminating terminal, wherein the update message comprises SDP information of customized ring signal media and is to modify the session, and wherein the customized ring signal media is to be played in the modified session.

13. The communication apparatus according to claim 12, wherein the execution of the instructions by the at least one processor further causes the communication apparatus to:
determine the SDP information of the customized ring signal media based on the provisional response.

14. The communication apparatus according to claim 12, wherein the provisional response is a 180 message or a 183 message.

15. The communication apparatus according to claim 12, wherein the execution of the instructions by the at least one processor further causes the communication apparatus to:
enable, based on the response, the terminating terminal to play the customized ring signal media.

16. The communication apparatus according to claim 12, wherein the execution of the instructions by the at least one processor further causes the communication apparatus to:
receive a response from the terminating terminal in response to the update message, wherein the response comprises an answer for the SDP information of the customized ring signal media.

17. A communication apparatus, comprising:
at least one processor; and
one or more memories coupled to the at least one processor and storing programming instructions for execution by the at least one processor to cause the communication apparatus to:
receive an initial invite request from an originating terminal, wherein the initial invite request is used to initiate a session, and wherein the initial invite request comprises session description protocol (SDP) information of the originating terminal;
send a provisional response to an application server in response to the initial invite request;
receive an update message from the application server, wherein the update message comprises SDP information of customized ring signal media and is to modify the session; and
after receiving the update message, play the customized ring signal media in the modified session
wherein the communication apparatus is a terminating terminal or a component in the terminating terminal.

18. The communication apparatus according to claim 17, wherein the execution of the instructions by the at least one processor further causes the communication apparatus to:
perform call media resource renegotiation with the originating terminal.

19. The communication apparatus according to claim 17, wherein the update message is a initiation protocol (SIP) UPDATE message.

20. A system, comprising: a call session control function and an application server,
wherein the call session control function comprises at least one first processor coupled to at least one memory storing instructions and configured to execute the instructions to cause the call session control function to:
receive a first initial invite request from an originating terminal;
send based on the first initial invite request, a third initial invite request to an application server;
wherein the application server comprises at least one second processor coupled to at least one memory storing instructions and configured to execute the instructions to cause the application server to:

send, based on the third initial invite request, a second initial invite request to a terminating terminal, wherein the first initial invite request, the second initial invite request, and the third initial invite request are used to initiate a session;

receive a provisional response from the terminating terminal in response to the second initial invite request;

send an update message to the terminating terminal, wherein the update message comprises resource information of customized ring signal media and is to modify the session, and wherein the customized ring signal media is to be played in the modified session.

\* \* \* \* \*